(12) United States Patent
Nomura et al.

(10) Patent No.: US 6,601,127 B1
(45) Date of Patent: Jul. 29, 2003

(54) COMMUNICATION CONTROL APPARATUS AND METHOD, COMMUNICATION SYSTEM, AND PROGRAM STORAGE MEDIUM

(75) Inventors: Takashi Nomura, Tokyo (JP); Hirofumi Tamori, Tokyo (JP)

(73) Assignee: Sony Corporation, Tokyo (JP)

( * ) Notice: Subject to any disclaimer, the term of this patent is extended or adjusted under 35 U.S.C. 154(b) by 512 days.

(21) Appl. No.: 09/652,635

(22) Filed: Aug. 31, 2000

(30) Foreign Application Priority Data

Sep. 8, 1999 (JP) .......................... P11-254069

(51) Int. Cl.⁷ .................. G06F 13/00; G06F 13/38; H04L 12/40
(52) U.S. Cl. ................ 710/306; 710/100; 370/401; 340/825.52
(58) Field of Search .................. 710/306, 63, 9, 710/100, 5; 340/825.52; 709/245, 227, 229, 218; 370/401, 402, 381, 392; 703/23; 711/100

(56) References Cited

U.S. PATENT DOCUMENTS

| | | | |
|---|---|---|---|
| 4,652,874 A | 3/1987 | Loyer | 340/825.05 |
| 4,723,120 A | 2/1988 | Petty, Jr. | 340/825.02 |
| 4,903,016 A | 2/1990 | Murai et al. | 340/825.07 |
| 5,007,051 A | 4/1991 | Dolkas et al. | 370/85.1 |
| 5,050,165 A * | 9/1991 | Yoshioka et al. | |
| 5,247,620 A * | 9/1993 | Fukuzawa et al. | |
| 5,280,480 A * | 1/1994 | Pitt et al. | |
| 5,400,246 A | 3/1995 | Wilson et al. | 364/146 |
| 5,418,527 A | 5/1995 | Yashiro | 340/825.24 |
| 5,420,724 A | 5/1995 | Kawamura et al. | 360/13 |
| 5,455,569 A | 10/1995 | Sherman et al. | 340/825.02 |
| 5,475,835 A | 12/1995 | Hickey | 395/600 |
| 5,481,750 A | 1/1996 | Parise et al. | 395/800 |
| 5,515,211 A | 5/1996 | Kawamura | 360/14.2 |

(List continued on next page.)

FOREIGN PATENT DOCUMENTS

| | | | |
|---|---|---|---|
| DE | 31 51 492 A1 | 7/1983 | H04N/5/44 |
| EP | 0 371 719 A2 | 6/1990 | H04B/1/20 |
| EP | 0 573 204 A2 | 12/1993 | H04L/12/40 |
| EP | 0 626 635 A2 | 11/1994 | G06F/3/00 |
| EP | 0 637 157 A2 | 2/1995 | H04L/29/06 |
| EP | 0 727 729 A1 | 8/1996 | G06F/1/32 |
| JP | 4-97468 | 3/1992 | G06F/13/14 |
| JP | 7-134628 | 5/1995 | G06F/1/31 |
| WO | WO 96/07971 | 3/1996 | G06F/13/38 |

OTHER PUBLICATIONS

A. Gefrides et al., "Standard Bus Connects up to 126 Peripherals: Plug and Play with USB," Computers XXXI (1996) No. 3, May 1996, pp. 36–38.

G. Hoffman et al., "IEEE 1394: A Ubiquitous Bus," IEEE May 3, 1995, pp. 334–338.

D. Bursky, "Networking Scheme Exploits Existing RS–232 Interface," Electronic Design, vol. 35, No. 13, May 1987., pp. 65–68.

IEEE Standard for a High Performance Serial Bus, IEEE Computer Society, IEEE Standard 1394–1995, Aug. 1996.

Primary Examiner—Gopal C. Ray
(74) Attorney, Agent, or Firm—Oblon, Spivak, McClelland, Maier & Neustadt, P.C.

(57) ABSTRACT

It is intended to enable control, without using personal computers, of a connection via an ATM network between devices that are connected to IEEE 1394 serial buses. When ATM addresses are assigned to IEEE 1394 serial buses that are connected to ATM/1394 bridges, TSCs (terminal system controllers) of the respective ATM/1394 bridges communicate the ATM addresses to a DCS (device control server) and the ATM addresses are stored in a database that is connected to the DCS. The DCS controls a connection between the devices that are connected to the IEEE 1394 serial buses.

15 Claims, 18 Drawing Sheets

U.S. PATENT DOCUMENTS

| | | |
|---|---|---|
| 5,537,605 A | 7/1996 | Teece .......................... 395/800 |
| 5,539,390 A | 7/1996 | Nagano et al. ........ 340/825.07 |
| 5,657,221 A | 8/1997 | Warman et al. ............. 364/188 |
| 5,687,334 A | 11/1997 | Davis et al. ................ 395/339 |
| 5,712,834 A | 1/1998 | Nagano et al. ............... 369/19 |
| 5,729,717 A | 3/1998 | Tamada et al. ............. 395/491 |
| 5,778,064 A | 7/1998 | Kori et al. ..................... 380/5 |
| 5,787,259 A | 7/1998 | Haroun et al. ......... 395/200.83 |
| 5,790,876 A | 8/1998 | Shima et al. .......... 397/750.03 |
| 5,793,366 A | 8/1998 | Mano et al. ................ 345/329 |
| 5,815,631 A | 9/1998 | Sugiyama et al. ............ 386/46 |
| 5,847,771 A | 12/1998 | Cloutier et al. ............. 348/564 |
| 5,850,573 A | 12/1998 | Wada ......................... 395/882 |
| 5,875,108 A | 2/1999 | Hoffberg et al. ............ 364/146 |
| 5,887,193 A | 3/1999 | Takahashi et al. .......... 395/828 |
| 5,960,445 A | 9/1999 | Tamori et al. .............. 707/203 |
| 5,963,450 A | 10/1999 | Dew ..................... 364/474.11 |
| 5,973,748 A | 10/1999 | Horiguchi et al. ........... 348/554 |
| 5,987,126 A | 11/1999 | Okuyama et al. .............. 380/5 |
| 6,115,392 A | 9/2000 | Nomura ..................... 370/466 |
| 6,442,168 B1 * | 8/2002 | Vasa |

* cited by examiner

FIG. 9

SETUP MESSAGE

| INFORMATION ELEMENT | DIRECTION | TYPE | LENGTH |
|---|---|---|---|
| PROTOCOL DISCRIMINATOR | BOTH | M | 1 |
| CALL REFERENCE | BOTH | M | 4 |
| MESSAGE TYPE | BOTH | M | 2 |
| MESSAGE LENGTH | BOTH | M | 2 |
| AAL PARAMETERS | BOTH | O | 4-21 |
| ATM TRAFFIC DESCRIPTOR | BOTH | M | 12-30 |
| BROADBAND BEARER CAPABILITY | BOTH | M | 6-7 |
| BROADBAND HIGH LAYER INFORMATION | BOTH | O | 4-13 |
| BROADBAND REPEAT INDICATOR | BOTH | O | 4-5 |
| BROADBAND LOW LAYER INFORMATION | BOTH | O | 4-17 |
| CALLED PARTY NUMBER | BOTH | M | |
| CALLED PARTY SUBADDRESS | BOTH | O | 4-25 |
| CALLING PARTY NUMBER | BOTH | O | 4-26 |
| CALLING PARTY SUBADDRESS | BOTH | O | 4-25 |
| CONNECTION IDENTIFIER | N → U | M | 9 |
| QoS PARAMETER | BOTH | M | 6 |
| BROADBAND SENDING COMPLETE | BOTH | O | 4-5 |
| TRANSIT NETWORK SELECTION | U → N | O | 4-8 |
| ENDPOINT REFERENCE | BOTH | O | 4-7 |

FIG. 10

ADD PARTY MESSAGE

| INFORMATION ELEMENT | DIRECTION | TYPE | LENGTH |
|---|---|---|---|
| PROTOCOL DISCRIMINATOR | BOTH | M | 1 |
| CALL REFERENCE | BOTH | M | 4 |
| MESSAGE TYPE | BOTH | M | 2 |
| MESSAGE LENGTH | BOTH | M | 2 |
| AAL PARAMETERS | BOTH | O | 4-20 |
| BROADBAND HIGH LAYER INFORMATION | BOTH | O | 4-13 |
| BROADBAND LOW LAYER INFORMATION | BOTH | O | 4-17 |
| CALLED PARTY NUMBER | BOTH | M | |
| CALLED PARTY SUBADDRESS | BOTH | O | 4-25 |
| CALLING PARTY NUMBER | BOTH | O | 4-26 |
| CALLING PARTY SUBADDRESS | BOTH | O | 4-25 |
| BROADBAND SENDING COMPLETE | BOTH | O | 4-5 |
| TRANSIT NETWORK SELECTION | N → U | O | 4-8 |
| ENDPOINT REFERENCE | BOTH | M | 7 |

FORMATION OF ASEL-UNI'S

| VIRTUAL NUID | ASEL-UNI ID | 1394 BUS ID | ATM ADDRESS |
|---|---|---|---|
| VNUID 1 | 001 | 01 | 0010···01 |
| VNUID 2 | 002 | 05 | 0010···05 |
| VNUID 3 | 003 | 06 | 0010···06 |

BROADBAND HIGH LAYER INFORMATION ELEMENT

FIG. 19

HIGH LAYER INFORMATION TYPE (5TH OCTET)

| BIT 7 | 6 | 5 | 4 | 3 | 2 | 1 | |
|---|---|---|---|---|---|---|---|
| 0 | 0 | 0 | 0 | 0 | 0 | 0 | ISO/IEC |
| 0 | 0 | 0 | 0 | 0 | 0 | 1 | USER-SPECIFIC |
| 0 | 0 | 0 | 0 | 0 | 1 | 1 | VENDER-SPECIFIC APPLICATION IDENTIFIER |
| 0 | 0 | 0 | 0 | 1 | 0 | 0 | ITU-T/TTC B-ISDN TELE-SERVICE RECOMMENDATION/STANDARD |

FIG. 20

ASEL VCC ENTRY

- ASEL VCC UNI ID
- ASEL VCC VPI
- ASEL VCC VCI
- ASEL VCC AAL TYPE
- ASEL VCC QoS TYPE
- ASEL VCC ISO CHANNEL
- ASEL VCC ENC METHOD
- ASEL VCC CIP APPL ID
- ASEL VCC ROUTE AREA

COMMUNICATION CONTROL APPARATUS AND METHOD, COMMUNICATION SYSTEM, AND PROGRAM STORAGE MEDIUM

BACKGROUND OF THE INVENTION

1. Field of the Invention

The present invention relates to a communication control apparatus and method, a communication system, and a program storage medium. In particular, the invention relates to a communication control apparatus and method, a communication system, and a program storage medium which make it possible to reliably control a connection between devices via a plurality of networks.

2. Description of the Related Art

In a system in which data on an IEEE (Institute of Electrical and Electronics Engineers) 1394 serial bus is transferred via an ATM (asynchronous transfer mode) network, to enable exchange of data between digital AV (audio-visual) devices connected to the ATM network, it is necessary to establish a data flowing connection in advance. The present assignee proposed a method for establishing such a connection, as Japanese Patent Application No. Hei. 11-147781 (corresponding to PCT Application No. JP 99/02864 and U.S. patent application Ser. No. 09/463,333), for example.

FIG. 1 shows an example configuration of this network system. As shown in FIG. 1, an ATM/1394 bridge 4-1-1 is connected to a personal computer 1-1-1 via an IEEE 1394 serial bus 2-1 and also connected to an ATM network 5 via a UNI (user-network interface). Video data that is transmitted from a digital video camera (DVCAM) 3-1 through the IEEE 1394 serial bus 2-1 is transferred to the ATM network 5. An ATM/1394 bridge 4-2-1 is connected to a personal computer 1-2-1 via an IEEE 1394 serial bus 7-1 and also connected to the ATM network 5 via a UNI. Video data that is transmitted from the digital video camera 3-1 over the ATM network 5 is transferred to the IEEE 1394 serial bus 7-1.

Connected to the digital video camera 3-1 via the IEEE 1394 serial bus 2-1, the personal computer 1-1-1 transfers, to the ATM/1394 bridge 4-1-1, through the IEEE 1394 serial bus 2-1, video data that is transmitted from the video camera 3-1 through the IEEE 1394 serial bus 2-1. That is, the digital video camera 3-1, the personal computer 1-1-1, and the ATM/1394 bridge 4-1-1 are connected to the same IEEE 1394 serial bus 2-1.

Connected to the ATM/1394 bridge 4-2-1 via the IEEE 1394 serial bus 7-1, the personal computer 1-2-1 transfers, to a digital video cassette recorder (DVCR) 8-1, through the IEEE 1394 serial bus 7-1, video data that is transmitted from the digital video camera 3-1 through the IEEE 1394 serial bus 7-1. The ATM/1394 bridge 4-2-1, the personal computer 1-2-1, and the digital video cassette recorder 8-1 are connected to the same IEEE 1394 serial bus 7-1.

To simplify the description, the above description has been made in such a manner that data is transferred from one sub-network system on the left side of the ATM network 5 to another sub-network system on the right side of the ATM network 5. However, in the example of FIG. 1, m sub-network systems are provided on the left side of the ATM network 5 and n sub-network systems are provided on the right side of the ATM network 5. Actually, data can be transferred from an arbitrary sub-network system among those sub-network systems to another arbitrary sub-network system.

When communication is performed between the personal computers 1-1-1 and 1-2-1, C (control)-plane protocol stacks are laid out as shown in FIG. 2.

As shown in FIG. 2, the C-plane protocol stack of the personal computer 1-1-1 is constituted of a 1394 PHY layer 11-1, a 1394 link layer 11-2, an ASEL layer 11-3, an SSCF (ITU-T Q.2130)+SSCOP (ITU-T Q.2110) layer 11-4, and a Q.2931 (ITU-T Q.2931) layer 11-5. The personal computer 1-1-1 side of the C-plane protocol stack of the ATM/1394 bridge 4-1-1 is constituted of a 1394 PHY layer 12-1, a 1394 link layer 12-2, an ASEL layer 12-3, an SSCF+SSCOP layer 12-4, and a Q.2931 layer 12-5. On the other hand, the ATM network 5 side is constituted of a PHY layer 13-1, an ATM layer 13-2, an AAL5 layer 13-3, the SSCF+SSCOP layer 12-4, and the Q.2931 layer 12-5.

The C-plane protocol stack of the ATM network 5 is constituted of a PHY layer 14-1, an ATM layer 14-2, an AAL5 layer 14-3, an SSCF+SSCOP layer 14-4, and a Q.2931 layer 14-5.

The ATM network 5 side of the C-plane protocol stack of the ATM/1394 bridge 4-2-1 is constituted of a PHY layer 15-1, an ATM layer 15-2, an AAL5 layer 15-3, an SSCF+SSCOP layer 15-4, and a Q.2931 layer 15-5. On the other hand, the personal computer 1-2-1 side is constituted of a 1394 PHY layer 16-1, a 1394 link layer 16-2, an ASEL layer 16-3, the SSCF+SSCOP layer 15-4, and the Q.2931 layer 15-5.

The C-plane protocol stack of the personal computer 1-2-1 is constituted of a 1394 PHY layer 17-1, a 1394 link layer 17-2, an ASEL layer 17-3, an SSCF+SSCOP layer 17-4, and a Q.2931 layer 17-5.

The ASEL layers 11-3 and 12-3 allow application of a signaling protocol that is used in the UNIs (user-network interfaces) of the ATM network 5 to interfacing between the personal computer 1-1-1 and the ATM/1394 bridge 4-1-1, and the ASEL layers 16-3 and 17-3 allow application of the same signaling protocol to interfacing between the ATM/1394 bridge 4-2-1 and the personal computer 1-2-1.

A description will now be made of the ASEL (ATM over IEEE 1394 serial bus emulation layer) layer for emulating an AAL5 (ATM adaptation layer type 5)/ATM layer (ITU-T I.363/ITU-T I.361) on the IEEE 1394 link layer of each of the ATM/1394 bridges 4-1-1 to 4-1-m and 4-2-1 to 4-2-n and the personal computers 1-1-1 to 1-1-m and 1-2-1 to 1-2-n.

The ASEL conceals the IEEE 1394 serial bus from software of the apparatus concerned above the ASEL and emulates AAL and ATM layers. Therefore, in an apparatus incorporating the ASEL, multiplexing and demultiplexing on the same UNI with a plurality of VPCs (virtual path connections)/VCCs (virtual channel connections) in an ATM communication are enabled in its own IEEE 1394 serial bus interface. Further, network access protocol software that is compatible with the ATM network 5 and various kinds of application software can be used as they are.

FIG. 3 is a layer relationship diagram showing the position of the ASEL. As shown in FIG. 3, the ASEL provides, as a primitive (transmission/reception information for a communication between layers) for the upper layer, a primitive that is similar to ones provided by various AALs. That is, the ASEL receives AAL_UNITDATA.req (request) from the upper layer and supplies it with AAL_UNITDATA.ind (indicate). The ASEL receives AAL_U_ABORT.req from the upper layer and supplies it with AAL_U_ABORT.ind. Further, the ASEL supplies the upper layer with AAL_P_ABORT.ind. In this manner, software of the upper layer of the ASEL behaves in the same manner as in a case where its lower layer is an AAL.

The ASEL uses, as a primitive for the lower layer, a primitive itself that is provided by the IEEE 1394 link layer. That is, the ASEL supplies the lower layer with LK_ISO_CONT.req and receives LK.CYCLE.ind from it. The ASEL supplies the lower layer with LK_ISO.req and receives LK_ISO.ind from it. Further, the ASEL supplies the lower layer with LK_DATA.req and receives LK_DATA.conf and LK_DATA.ind from it, and supplies the lower layer with LK_DATA.resp.

Further, the ASEL exchanges, with its own (local) ASEL layer management entity (peer interface), an ASEL management primitive including various kinds of management information relating to configuration, faults, performance, alarming, etc. of a counterpart ASEL entity and the ASEL entity itself. For example, when an abnormality has been detected, prescribed management information is supplied to the peer interface and output to the counterpart ASEL entity via a system interface. Control information coming from another ASEL entity is supplied to the ASEL via the system interface and the peer interface.

Next, the main functions of the ASEL will be described. The ASEL entity can set a plurality of VPCs/VCCs on an isochronous channel. The ASEL entity of each of the ATM/1394 bridges 4-1-1 to 4-1-m and 4-2-1 to 4-2-n assigns arbitrary VPI (virtual path identifier)/VCI (virtual channel identifier) values to VPCs/VCCs on isochronous channels that are used by the personal computers 1-1-1 to 1-1-m and 1-2-1 to 1-2-n that are connected to the IEEE 1394 serial bus interface that is accommodated by the ASEL entity itself via the IEEE 1394 serial buses 2-1 to 2-m and 7-1 to 7-n.

Further, the ASEL entity of each of the ATM/1394 bridges 4-1-1 to 4-1-m assigns arbitrary VPI/VCI values to respective self-IDs (e.g., IDs that are automatically assigned according to the IEEE 1394 standard at the time of power application or the like) that are used as counterpart node ID numbers by the personal computers 1-1-1 to 1-1-m that are connected to the IEEE 1394 serial bus interface that is accommodated by the ASEL entity itself via the IEEE 1394 serial buses 2-1 to 2-m. The ASEL entity of each of the ATM/1394 bridges 4-2-1 to 4-2-m assigns arbitrary VPI/VCI values to self-IDs that are used as counterpart node ID numbers by the personal computers 1-2-1 to 1-2-n that are connected to the IEEE 1394 serial bus interface that is accommodated by the ASEL entity itself via the IEEE 1394 serial buses 7-1 to 7-n. The ASEL entity sets and identifies a plurality of VPI/VCI values for respective Dest (destination)-IDs that are counterpart node ID numbers at the time of transmission and for respective Src (source)-IDs that are node ID numbers of the ASEL entity itself at the time of reception. Various parameters relating to a VPC/VCC are set by using a primitive that is supplied to the ASEL layer management via the system interface.

Further, the ASEL assures Qos (quality of service). That is, the ASEL assures, to users, Qos by performing a CBR (constant bit rate) service of the ATM by using IEEE 1394 isochronous packets and by performing a UBR (unassigned bit rate) service and an ABR (available bit rate) service of ATM by using IEEE 1394 isochronous packets.

Next, a connection control procedure for transferring digital video data from the digital video camera 3-1 to the digital video cassette recorder 8-1 will be described with reference to a flowchart of FIG. 4. It is assumed that the personal computers (PCs) 1-1-1 and 1-2-1 perform connection controls in place of the digital video camera 3-1 and the digital video cassette recorder 8-1, respectively.

At step S11, to perform an exclusion control of connection setting, the personal computer 1-1-1 transmits, to the personal computer 1-2-1 that is connected to the same IEEE 1394 serial bus 7-1 as the counterpart digital video cassette recorder 8-1 is connected, a request for accepting connection to the digital video cassette recorder 8-1. This operation can be performed in the manner as described in Japanese Patent Application No. Hei. 8-82545 (corresponding to PCT Application No. JP 97/01178 and U.S. patent application Ser. No. 08/973,175), for example, of the present assignee.

At step S12, after recognizing a node unique identifier (node unique identifiers are assigned in advance to all devices that use the IEEE high-speed serial buses) of the digital video cassette recorder 8-1, the personal computer 1-2-1 starts an exclusion control for other connection acceptance requests and turns on a proxy signaling flag indicating that the personal computer 1-2-1 will execute an ATM signaling process in place of the digital video cassette recorder 8-1. At step S13, the personal computer 1-2-1 transmits, to the personal computer 1-1-1, a response indicating acceptance of connection to the digital video cassette recorder 8-1.

At step S14, the personal computer 1-1-1 turns on a proxy signaling flag indicating that the personal computer 1-1-1 will execute an ATM signaling process in place of the digital video camera 3-1 and starts execution of the ATM signaling process. At step S15, the personal computer 1-1-1 transmits a VCC setting request message to the personal computer 1-2-1. The personal computer 1-1-1 specifies, in the VCC setting request message, that digital video data using CIP is to flow through the connection.

Upon reception of the VCC setting request, at step S16 the personal computer 1-2-1 sets, in its own ASEL entity, VCC parameters such as a VPI/VCI, a Qos type parameter (in this case, CBR (constant bit rate)), an AAL type parameter (in this case, AAL5), an isochronous packet encapsulation method parameter (in this case, CIP format), and a transmission/reception bandwidth parameter. Since the preset proxy signaling flag is on, the transmission/reception bandwidth parameter is set at "0" to prevent reception of digital video data that flows through the VCC.

At step S17, the personal computer 1-2-1 transmits an IsoReq message that is an ASEL-CMP (connection management protocol) to the ATM/1394 bridge 4-2-1 as an isochronous resource manager of the IEEE 1394 serial bus 7-1 and thereby requests assigning of an isochronous channel corresponding to the VPI/VCI assigned to the VCC.

Since the ASEL entity of the personal computer 1-2-1 set at step S16 the VCC isochronous packet encapsulation method parameter indicating the CIP format, at step S17 the personal computer 1-2-1 can transmit, to the ATM/1394 bridge 4-2-1, an IsoReq message in which optional mode information is set to a value corresponding to it (i.e., the two MSB-side bits are set at "01" and the remaining six bits are set at "000000" in the case of DVCR and at "100000" in the case of MPEG). By receiving this IsoReq message, the ATM/1394 bridge 4-2-1 similarly recognizes that the VCC isochronous packet encapsulation method is the CIP format.

At step S18, the ATM/1394 bridge 4-2-1 acquires an isochronous channel on the IEEE 1394 serial bus 7-1 and transmits an IsoRply message to the personal computer 1-2-1. At this time, the ASEL entity of the ATM/1394 bridge 4-2-1 registers, in the IsoRply, the VPI/VCI of the VCC and the acquired isochronous channel in such a manner that they are correlated with each other one to one.

At step S19, the personal computer 1-2-1 requests the digital video cassette recorder 8-1 to rewrite the contents of an iPCR (input plug control register) to enable reception on the acquired isochronous channel.

At step S20, the digital video cassette recorder 8-1 sets the isochronous channel in the iPCR. At step S21, the digital video cassette recorder 8-1 transmits, to the personal computer 1-2-1, a response to the effect that the isochronous channel has been set in the iPCR.

At step S22, the personal computer 1-2-1 transmits a VCC setting response message to the personal computer 1-1-1. At step S23, the personal computer 1-2-1 cancels the exclusion control for other connection acceptance requests and turns off the proxy signaling flag indicating that the personal computer 1-1-1 executes the ATM signaling process in place of the digital video cassette recorder 8-1.

Upon reception of the VCC setting response message, at step S24 the personal computer 1-1-1 sets, in its own ASEL entity, VCC parameters such as a VPI/VCI, a Qos type parameter (in this case, CBR), an AAL type parameter (in this case, AAL5), an isochronous packet encapsulation method parameter (in this case, CIP format), and a transmission/reception bandwidth parameter. Since the preset proxy signaling flag is on, the transmission/reception bandwidth parameter is set at "0" to prevent reception of digital video data that flows through the VCC.

At step S25, to request assigning of an isochronous channel on the IEEE 1394 serial bus 2-1 corresponding to the VPI/VCI assigned to the VCC, the personal computer 1-1-1 transmits an IsoReq message that is an ASEL-CMP to the ATM/1394 bridge 4-1-1. At step S26, the ATM/1394 bridge 4-1-1 acquires an isochronous channel on the IEEE 1394 serial bus 2-1 and transmits an IsoRply message to the personal computer 1-1-1. At this time, the ASEL entity of the ATM/1394 bridge 4-1-1 registers, in the IsoRply message, the VPI/VCI of the VCC and the isochronous channel in such a manner that they are correlated with each other one to one.

At step S27, the personal computer 1-1-1 turns off the proxy signaling flag indicating that the personal computer 1-1-1 executes the ATM signaling process in place of the digital video camera 3-1.

At step S28, the personal computer 1-1-1 requests the digital video camera 3-1 to rewrite the contents of an oPCR (output plug control register) to enable reception on the acquired isochronous channel. At step S29, the digital video camera 3-1 sets the isochronous channel in the oPCR. At step S30, the digital video camera 3-1 transmits, to the personal computer 1-1-1, a response to the effect that the isochronous channel has been set in the oPCR.

In the above manner, a connection for transfer of digital video data from the digital video camera 3-1 to the digital video cassette recorder 8-1 is established.

In digital AV devices that are connected to the IEEE 1394 serial buses 2-1 to 2-m and 7-1 to 7-n, the software is not very complex and most of applications are implemented by hardware. That is, such digital AV devices are configured so strong that an operation hardly hangs up (i.e., they are hardly rendered non-operational). In contrast, since the personal computers 1-1-1 to 1-1-m and 1-2-1 to 1-2-n incorporate an enormous amount of software that is more complex than in digital AV devices, the possibility of operation hanging-up is not low. Where such personal computers are connected to respective 1394 serial buses, there is great fear that when one digital AV device is added to or removed from the network system the reliability of the entire network system may be lowered.

In conventional network systems, prior to connection setting, information is exchanged between personal computers point to point by using the IP over ATM. In this case, since connections between personal computers are established in mesh form, the number of connections increases as the scale of the network system increases. For example, if there exist N personal computers, the maximum number Np of necessary connections is equal to $N(N-1)/2$. This results in a problem that the management of the entire network system becomes complex and that at the occurrence of a trouble it is difficult to make an analysis as to what caused the trouble; that is, the system is less resistant to troubles.

SUMMARY OF THE INVENTION

The present invention has been made in view of the above circumstances in the art, and an object of the invention is therefore to realize a more reliable network system.

According to a first aspect of the invention, there is provided a communication control apparatus which controls a communication of a network to which a plurality of bridges that interface between a first network and a second network are connected, comprising storage control means for controlling storage of address information of the second network that is assigned to the first network and that is communicated from the bridges; and connection control means for controlling a connection, via the first network and the second network, between devices connected to the first network by using the address information of the first network that was stored based on the control of the storage control means.

The first network may be IEEE 1394 serial buses and the second network may be an ATM network.

The connection control means may perform connection on the network in place of the devices.

The communication control apparatus may further comprise exclusion processing means for preventing, when two of the devices are to be connected to each other via the network, the two devices from being connected to other devices.

There is provided a communication control method of a communication control apparatus which controls a communication of a network to which a plurality of bridges that interface between a first network and a second network are connected, comprising a storage control step of controlling storage of address information of the second network that is assigned to the first network and that is communicated from the bridges; and a connection control step of controlling a connection, via the first network and the second network, between devices connected to the first network by using the address information of the first network that was stored based on the control of the storage control step.

There is provided a program storage medium for causing a communication control apparatus which controls a communication of a network to which a plurality of bridges that interface between a first network and a second network are connected, to execute a process comprising a storage control step of controlling storage of address information of the second network that is assigned to the first network and that is communicated from the bridges; and a connection control step of controlling a connection, via the first network and the second network, between devices connected to the first network by using the address information of the first network that was stored based on the control of the storage control step.

According to a second aspect of the invention, there is provided a communication control apparatus which interfaces between a first network and a second network and controls a communication of a device connected to the first network in cooperation with a second communication control apparatus, comprising assigning means for assigning address information of the second network to a part of the first network connected to the communication control apparatus; and notifying means for notifying the second communication control apparatus of the address information of the second network that was assigned to the part of the first network by the assigning means.

The communication control apparatus may further comprise concealing means for interfacing between the first network and the second network and for concealing the part of the first network from a higher layer; and correlating means for correlating the concealing means with at least one of the part of the first network and a virtual device connected to the part of the first network.

The communication control apparatus may further comprise emulating means for emulating an operation of the concealing means.

The first network may be IEEE 1394 serial buses and the second network may be an ATM network.

There is provided a communication control method of a communication control apparatus which interfaces between a first network and a second network and controls a communication of a device connected to the first network in cooperation with a second communication control apparatus, comprising an assigning step of assigning address information of the second network to a part of the first network connected to the communication control apparatus; and a notifying step of notifying the second communication control apparatus of the address information of the second network that was assigned to the part of the first network by the assigning step.

There is provided a program storage medium for causing a communication control apparatus which interfaces between a first network and a second network and controls a communication of a device connected to the first network in cooperation with a second communication control apparatus, to execute a process comprising an assigning step of assigning address information of the second network to a part of the first network connected to the communication control apparatus; and a notifying step of notifying the second communication control apparatus of the address information of the second network that was assigned to the part of the first network by the assigning step.

According to a third aspect of the invention, there is provided a communication control system comprising a plurality of first apparatuses for interfacing between a first network and a second network, each of the first apparatuses comprising assigning means for assigning address information of the second network to a part of the first network that is connected to the first apparatus; and notifying means for notifying a second apparatus of the address information of the second network that was assigned to the part of the first network by the assigning means; and the second apparatus for controlling a communication in a network between devices connected to the first apparatuses via the first network, the second apparatus comprising storage control means for controlling storage of the address information of the second network that is assigned to the first network and that is communicated from the first apparatuses; and connection control means for controlling a connection, via the first network and the second network, between devices connected to the first network by using the address information of the first network that was stored based on the control of the storage control means.

There is provided a communication control method of a communication control system comprising a plurality of first apparatuses for interfacing between a first network and a second network and a second apparatus for controlling a communication in a network between devices connected to the first apparatuses via the first network, the communication control method comprising a communication control method of each of the first apparatuses, comprising an assigning step of assigning address information of the second network to a part of the first network that is connected to the first apparatus; and a notifying step of notifying the second apparatus of the address information of the second network that was assigned to the part of the first network by the assigning step; and a communication control method of the second apparatus, comprising a storage control step of controlling storage of the address information of the second network that is assigned to the first network and that is communicated from the first apparatuses; and a connection control step of controlling a connection, via the first network and the second network, between devices connected to the first network by using the address information of the first network that was stored based on the control of the storage control step.

There is provided a program storage medium for causing each first apparatus and a second apparatus of a communication control system comprising a plurality of first apparatuses for interfacing between a first network and a second network and the second apparatus for controlling a communication in a network between devices connected to the first apparatuses via the first network, to execute a first process and a second process, respectively, the first process comprising an assigning step of assigning address information of the second network to a part of the first network that is connected to the first apparatus; and a notifying step of notifying the second apparatus of the address information of the second network that was assigned to the part of the first network by the assigning step, the second process comprising a storage control step of controlling storage of the address information of the second network that is assigned to the first network and that is communicated from the first apparatuses; and a connection control step of controlling a connection, via the first network and the second network, between devices connected to the first network by using the address information of the first network that was stored based on the control of the storage control step.

In the communication control apparatus, the communication control method, and the program storage medium according to the first aspect of the invention, address information of the second network is assigned to the first network that is connected to the bridges and a connection via the first network and the second network is controlled by using the address information.

In the communication control apparatus, the communication control method, and the program storage medium according to the second aspect of the invention, address information of the second network that is assigned to the first network is communicated to another communication control apparatus.

In the communication control system, the communication control method, and the program storage medium according to the third aspect of the invention, the first apparatuses assign address information of the second network to the first network and the second apparatus controls a connection via the first network and the second network by using the address information of the second network that has been assigned to the first network.

BRIEF DESCRIPTION OF THE DRAWINGS

FIG. 9 shows information elements of a setup message;

FIG. 10 shows information elements of an add party message;

FIG. 19 shows a high layer information type; and

FIG. 20 shows the structure of an ASEL entry.

DETAILED DESCRIPTION OF THE PREFERRED EMBODIMENT

Figure 5:
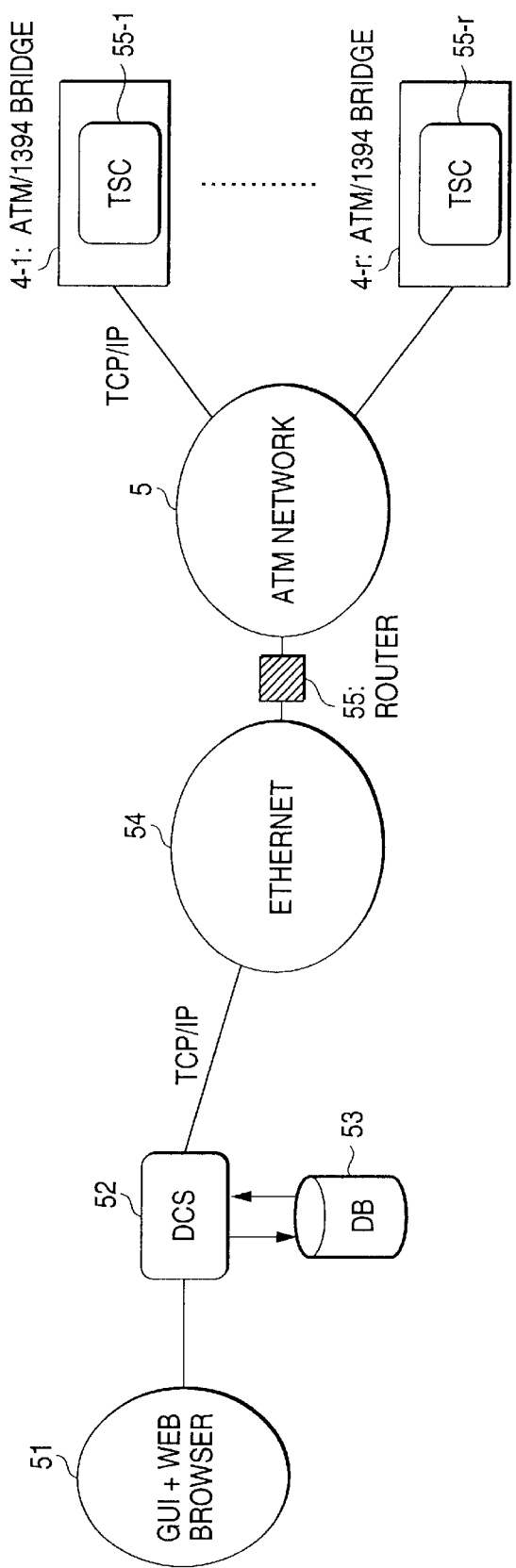
FIG. 5 shows an example configuration of a network system to which the present invention is applied.

FIG. 5 shows an example basic configuration of a network system to which the invention is applied. In this example configuration, ATM/1394 bridges 4-1 to 4-r are connected to an ATM network 5. The ATM/1394 bridges 4-1 to 4-r have respective TSCs (terminal system controllers) 55-1 to 55-r. Each TSC, which is implemented for each bus as an application software module on the corresponding bridge, controls and manages a digital AV device that is connected to the corresponding 1394 serial bus by using an AV/C (AV command) and a PCR (plug control register).

An Ethernet (trademark) 54 is connected to the ATM network 5 via a router 55 and a DCS (device control server) 52 is connected to the Ethernet 54. A database (DB) 53 is connected to the DCS 52, and the DCS 52 records, in the database 53, information that is transferred from the TSCs 55-1 to 55-r. Such information includes an IP address and an ATM address for each TSC and a node unique ID (NUID) and a type name of a digital AV device connected to the corresponding 1394 serial bus. Based on the information recorded in the database 53, the DCS 52 manages all digital AV devices connected to the ATM/1394 bridges 4-1 to 4-r in cooperation with the TSCs 55-1 to 55-r. A GUI (graphic user interface) through which a user inputs various manipulations is connected to the DCS 52. The GUI 51 includes a Web browser for browsing the network.

Communication between the DCS 52 and the TSCs 55-1 to 55-r is performed by using the TCP/IP (transport control protocol/Internet protocol). The database 53 is accessed by the TSCs 55-1 to 55-r only via the DCS 52.

Figure 6:
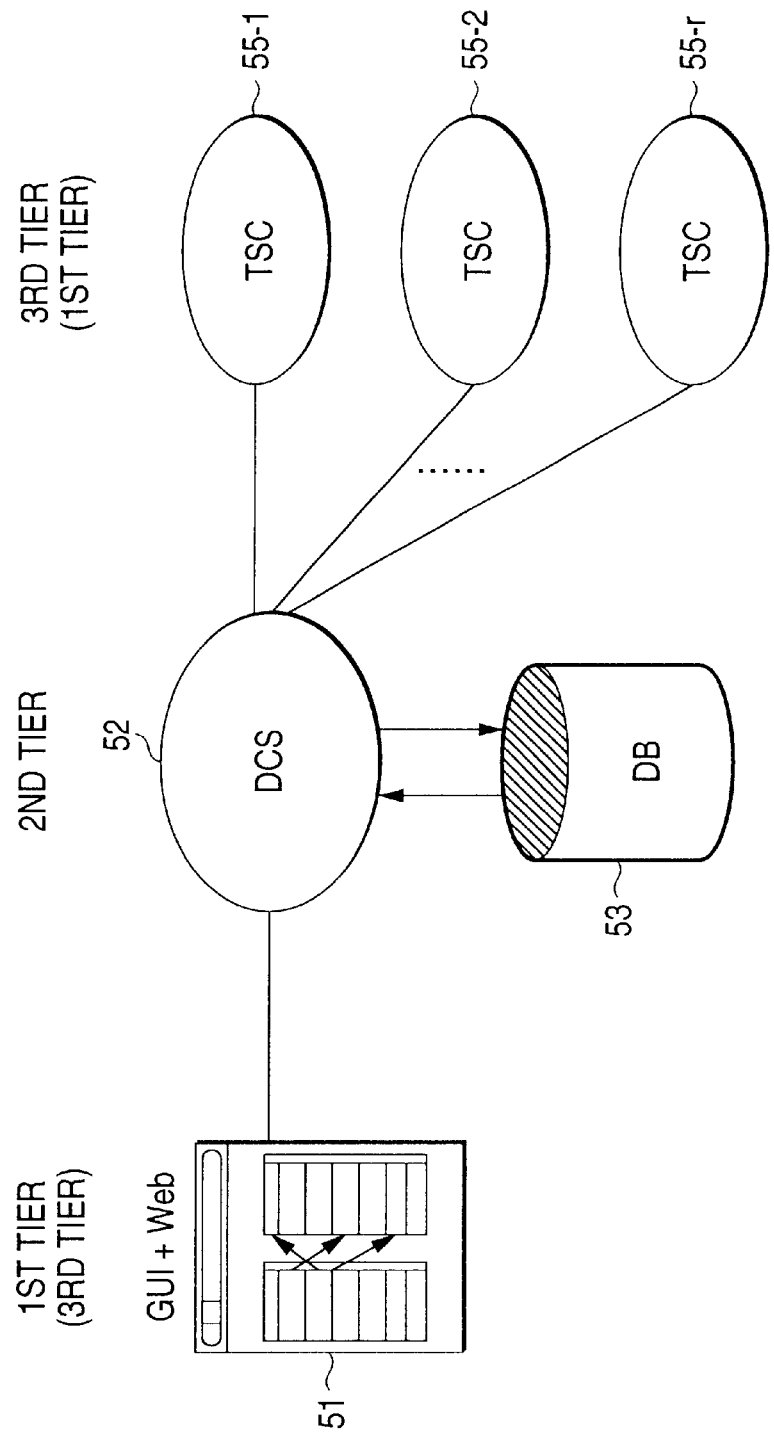
FIG. 6 shows the configuration of a three-tier resource management model according to the invention.

FIG. 6 shows a resource management model of the network of FIG. 5. In this three-tier model, the first tier (or the third tier) is the GUI 51, the second tier is the DCS 52 having the database 53, and the third tier (or the first tier) is constituted of the TSCs 55-1 to 55-r. This three-tier model is disclosed in Japanese Patent Application No. Hei. 11-184682 (a corresponding U.S. patent application is now being prepared).

Figure 1:
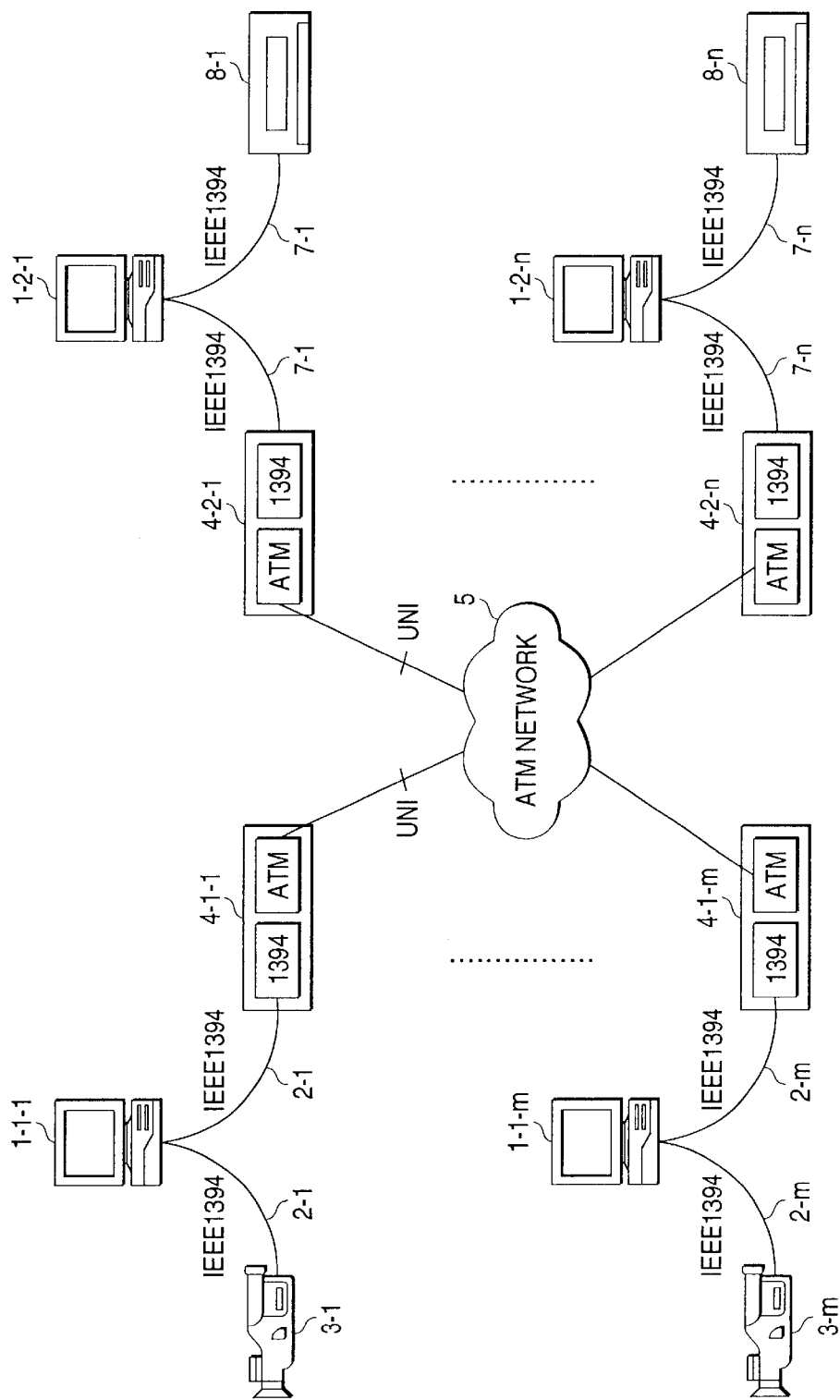
FIG. 1 is a block diagram showing an example configuration of a conventional network system.
Figure 7:
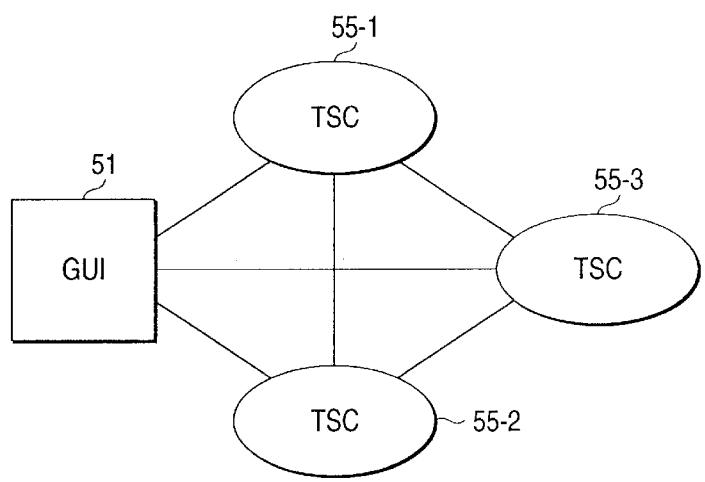
FIG. 7 shows, for comparison, the configuration of the conventional resource management model.

For comparison, FIG. 7 shows a resource management model of the above-described conventional network system of FIG. 1 in the same manner as in FIG. 6. That is, a GUI 51 is connected to TSCs 55-1 to 55-3, which are connected to each other in mesh form.

In contrast, in the resource management model of FIG. 6 according to the invention, since all TSCs 55-1 to 55-r are connected directly to the DCS 52, management is easy and addition or alteration can be made easily in the third tier (or the first tier).

Although the single DCS 52 is provided in the example of FIGS. 5 and 6, it goes without saying that a plurality of DCSs may be provided. However, where DCSs are personal computers that are weaker than workstations and the like, there is fear that provision of an unduly large number of DCSs may lower the reliability of the entire network system. It is therefore preferable that the number of DCSs be as small as possible. However, since basically one DCS 52 controls a plurality of TSCs 55-1 to 55-r, the number of personal computers in the entire network system of FIG. 5 is smaller than in the network system of FIG. 1 and hence its reliability can be increased.

Figure 8:
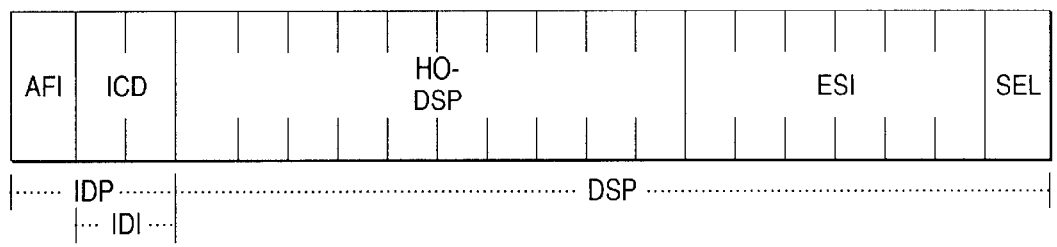
FIG. 8 shows an ATM address format.

In the invention, the ATM/1394 bridges 4-1 to 4-r assign ATM addresses as identifiers to the IEEE 1394 serial buses that are connected to the respective ATM/1394 bridges 4-1 to 4-r. An ATM address format is prescribed as shown in FIG. 8. The first three octets are an IDP (initial domain part) and the remaining 17 octets are a DSP (domain specific part). Items that are responsible for the arrangement and assignment of values in the DSP are specified in the IDP. The IDP consists of two fields, that is, an AFI (authority and format identifier) and an IDI (initial domain identifier). A data country code, an international code designator, or an E.164 number, an IDI format, etc. are prescribed in the AFI.

An international organization is prescribed in an ICD (international code designator). The organization that is responsible for the registration of ICDs is maintained by the British Standards Institute.

The DSP is constituted of an HO-DSP (high order DSP) and a low-order part, which consists of an ESI (end system identifier) and an SEL (selector).

The HO-DSP prescribes items representing the hierarchy and topology of addressing members in such a manner as to enable routing for connected ATM sub-networks.

The ESI prescribes a termination point system. This identifier needs to be unique to a value as a combination of the IDP and the HO-DSP. The ESI may be a global unique ID that is prescribed by an IEEE MAC (media access control) address.

The SEL is not used for ATM routing and is made usable in terminal systems. Therefore, in the invention, the SEL is used by the ATM/1394 bridges 4-1 to 4-r as ATM terminals. Since the SEL is of one octet, each of the ATM/1394 bridges 4-1 to 4-r (TSCs 55-1 to 55-r) can use, as the SEL, a value selected from 1 to 255 as an identifier of the IEEE 1394 serial bus that is connected to it. Therefore, a maximum of 255 buses can be distinguished from each other. Usually, a SEL value "0" is used for a terminating application (e.g., the IP over ATM that is used by the TSCs 55-1 to 55-r) provided on the ATM side of the ATM/1394 bridge.

Where it is necessary to distinguish among 256 or more buses, the 14th to 19th octets, that is, the ESI, of the ATM address are used. ESI values are set by the ATM terminal side with respect to the ATM network and may be so set as to be different for the respective TSCs.

The ATM address can be defined in an information element "called party number" in a setup message shown in FIG. 9 and an add party message shown in FIG. 10 that are prescribed in the ATM User-Network Interface Specification (v3.1). This specification can be obtained by accessing the following URL:

ftp://ftp.atmforum.com/pub/approved-specs/af-uni-0010.002/

The setup message shown in FIG. 9, which is a message that is output from a calling user to the network or transmitted from the network to a called user when establishment of a call is started, includes, in addition to "called party number," such information elements as "protocol discriminator" to "endpoint reference." The add party message, which is a message that is transmitted when, for example, a party involved is added to existing connections, includes, in addition to "called party number," information elements shown in FIG. 10 such as "protocol discriminator" to "endpoint reference."

By using the above mechanism, upon reception of an ATM signaling message a reception-side ATM/1394 bridge can identify an IEEE 1394 serial bus to which signaling should be performed. Identifying an IEEE 1394 serial bus by using an ATM address in this manner makes it unnecessary for a reception-side ATM/1394 bridge to perform processing of selecting a 1394 serial bus by using a node unique ID of a reception-side digital AV device prior to ATM signaling as in the conventional case.

Figure 11:
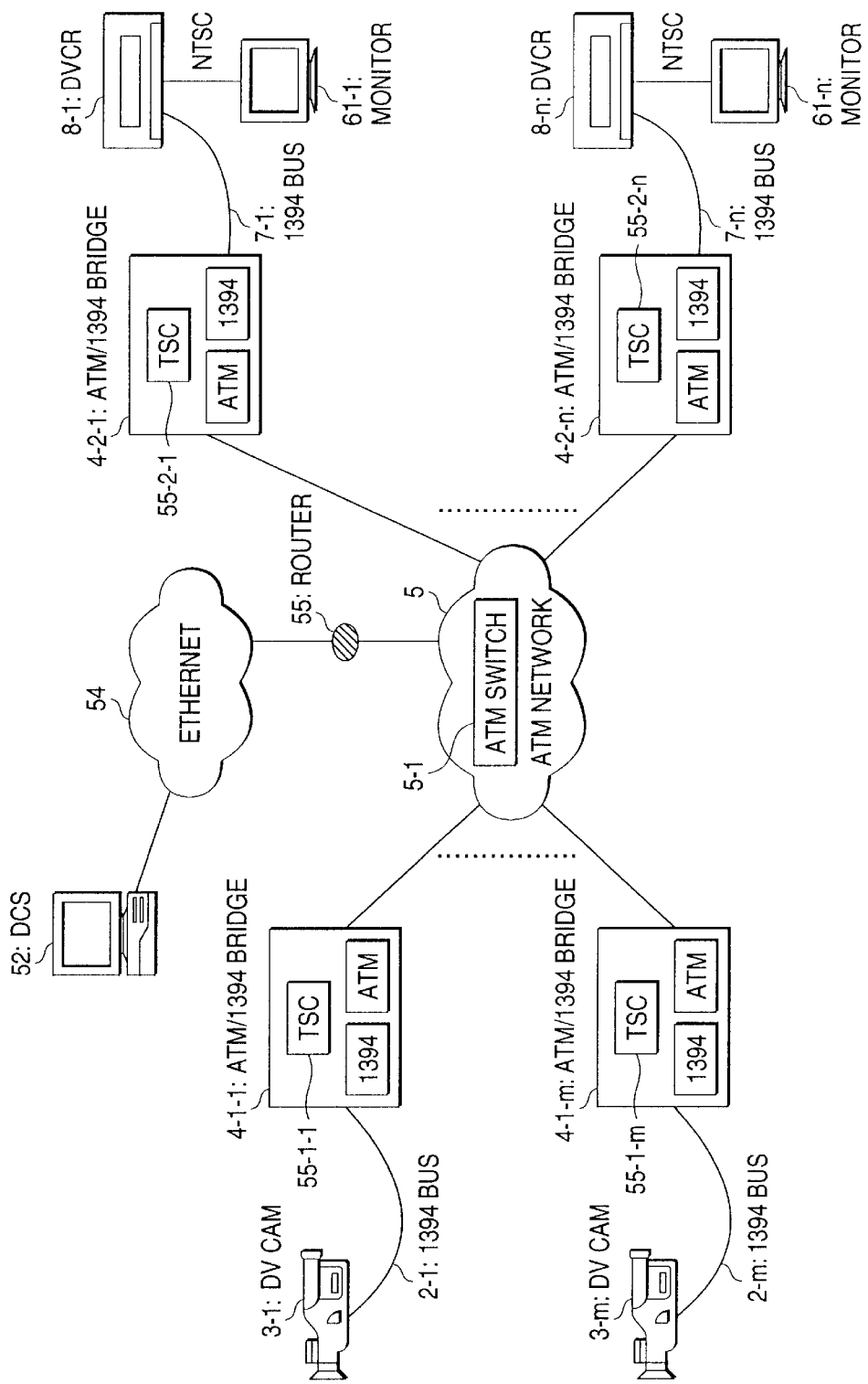
FIG. 11 shows an example configuration of a more specific network system to which the invention is applied.

FIG. 11 shows an example configuration of a more specific network system to which the invention is applied. The components in FIG. 11 having the corresponding components in FIGS. 1 or 5 are given the same reference symbols as the latter and descriptions of those components will be omitted where appropriate. In this network system, ATM/1394 bridges 4-1-1 to 4-1-m that interface between an ATM network 5 and IEEE 1394 serial buses 2-1 to 2-m have respective TSCs 55-1-1 to 55-1-m. Similarly, ATM/1394 bridges 4-2-1 to 4-2-n have respective TSCs 55-2-1 to 55-2-n. Monitors 61-1 to 61-n are connected to respective digital video cassette recorders 8-1 to 8-n.

Incorporating an ATM switch 5-1, the ATM network 5 connects a prescribed communication path with another communication path by using the ATM switch 5-1. A DCS 52 is connected to the ATM network 5 via a router 55 and an Ethernet 54. The DCS 52 has a database 53 in a hard disk drive 130 (see FIG. 13) that is incorporated in the DCS 52. The other part of the configuration of the network system of FIG. 11 is the same as shown in FIG. 1.

Figure 12:
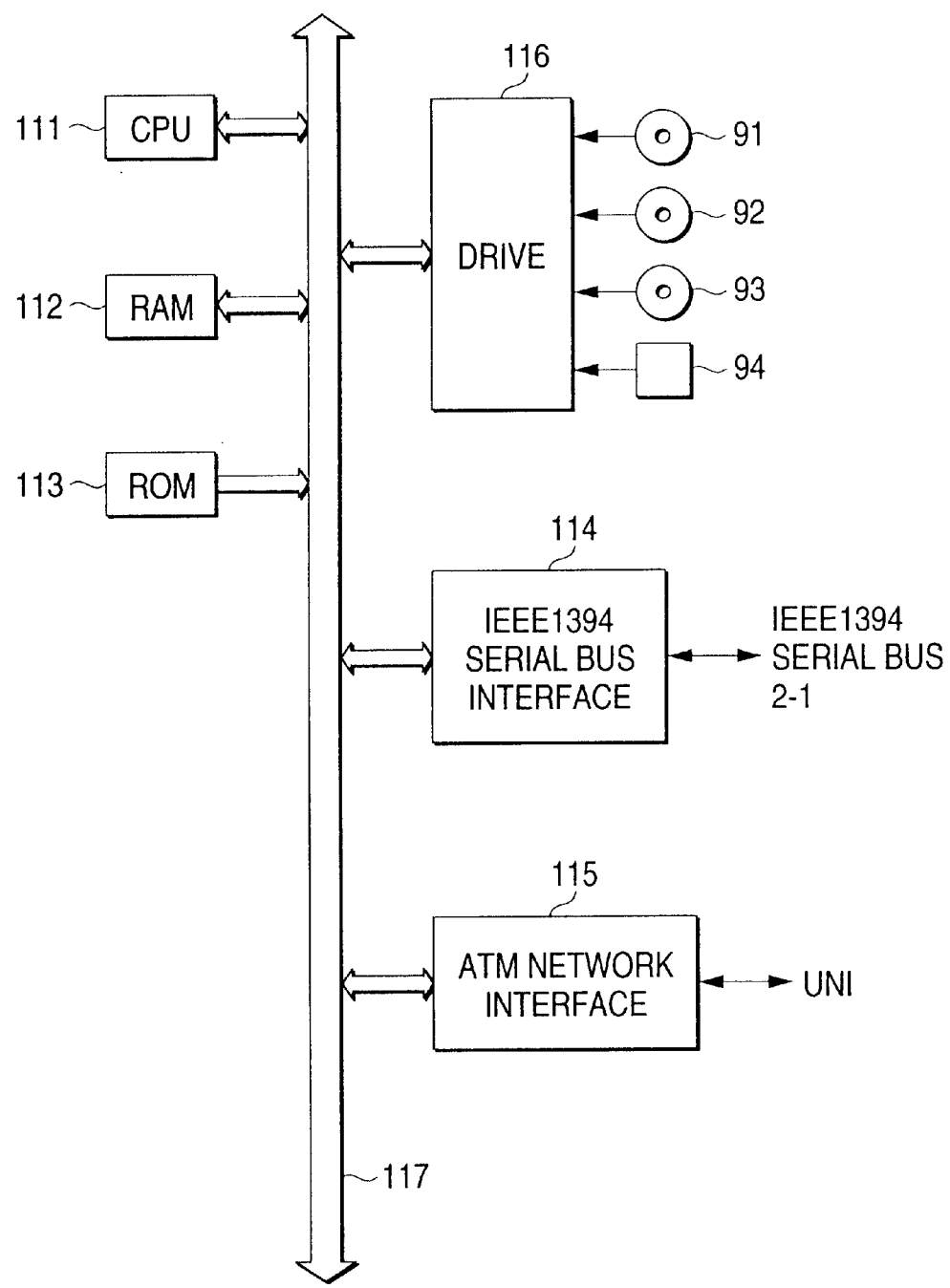
FIG. 12 is a block diagram showing an example configuration of an ATM/1394 bridge 4-1-1 shown in FIG. 11.

FIG. 12 shows an example hardware configuration of the ATM/1394 bridge 4-1-1. A CPU (central processing unit) 111 executes various programs. A RAM (random access memory) 112 stores a program that is used when the CPU 111 executes any of various processes and parameters that vary when such a process is executed. A ROM (read-only memory) 113 stores programs to be used by the CPU 111 and parts of computation parameters that are basically fixed.

An IEEE 1394 serial bus interface 114, which is connected to the IEEE 1394 serial bus 2-1, converts data into a form that is suitable for the IEEE 1394 serial bus 2-1 and outputs the resulting data. Further, the IEEE 1394 serial bus interface 114 receives a signal from the IEEE 1394 serial bus 2-1 and extracts necessary data. An ATM network interface 115, which is connected to a UNI via a prescribed communication medium (e.g., a coaxial cable or an optical cable), converts data into a form that is suitable for the UNI and outputs the resulting data. Further, the ATM network interface 115 receives a signal from the ATM network 5 via the UNI and extracts necessary data.

A drive 116 drives a magnetic disk 91, an optical disc 92, a magneto-optical disc 93, a semiconductor memory 94, or the like, and outputs a read-out program or data to the CPU 111. The CPU 111 to the drive 116 are connected to each other via an internal bus 117.

The hardware configuration of each of the ATM/1394 bridges 4-1-i (i=2, 3, . . . , m) and 4-2-j (j=1, 2, . . . , n) is the same as that of the ATM/1394 bridge 4-1-1 and hence is not described.

Figure 13:
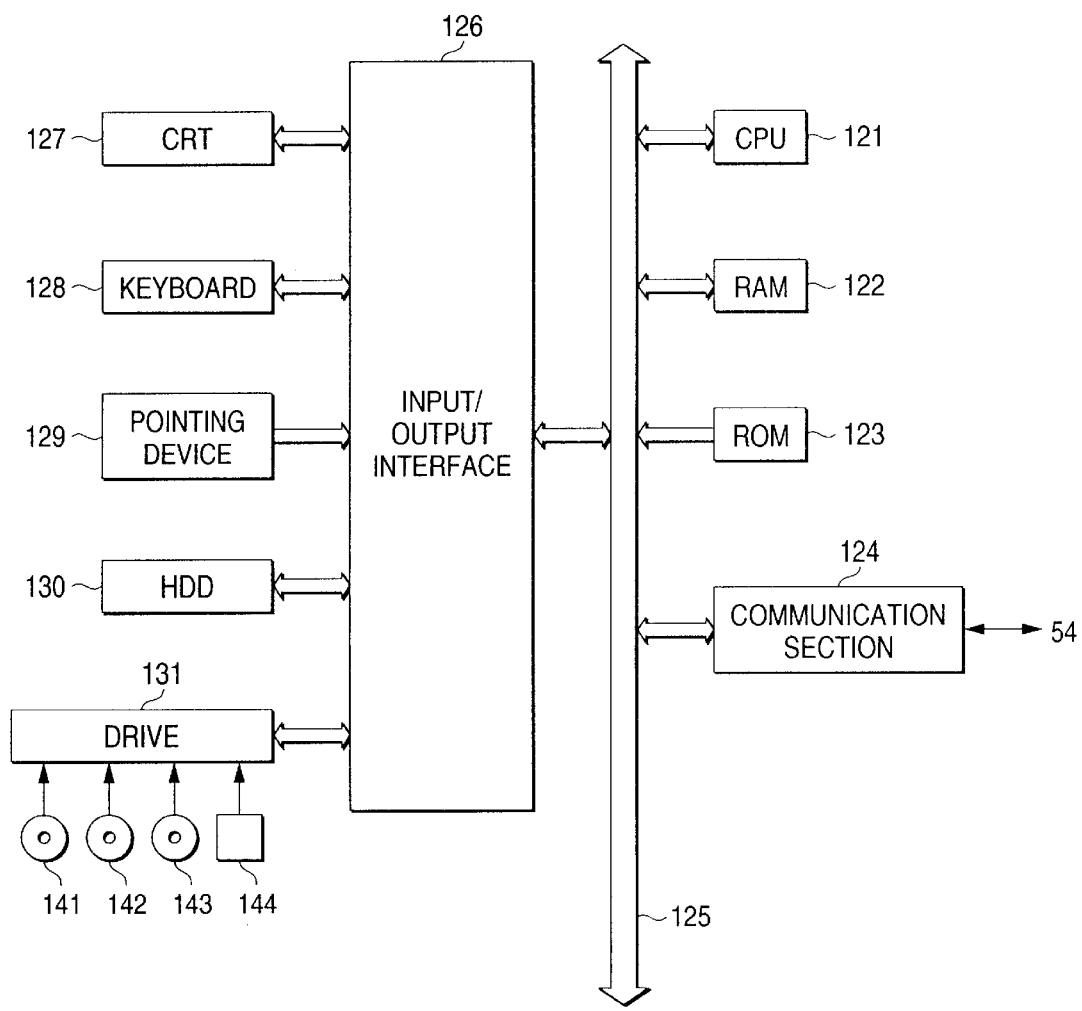
FIG. 13 is a block diagram showing an example configuration of a DCS 52 shown in FIG. 11.

FIG. 13 shows an example hardware configuration of the DCS 52 that is a workstation (or may be a personal computer). Since a CPU 121, a RAM 122, and a ROM 123 are similar to the CPU 111, the RAM 112, and the ROM 113 shown in FIG. 12, respectively, they are not described here. A communication section 124, which is connected to the Ethernet 54, converts data into a format that is suitable for the Ethernet 54 and outputs the resulting data. Further, the communication section 124 receives a signal from the Ethernet 54 and extracts necessary data.

A CRT (cathode-ray tube) display 127, a keyboard 128, a pointing device 129 such as a mouse or a track ball, an HDD (hard disk drive) 130, and a drive 131 are connected to an internal bus 125 via an input/output interface 126. The CRT display 127 displays display data that is supplied from the CPU 121. The keyboard 128 supplies the CPU 121 with a signal corresponding to a manipulation of a user. The pointing device 129 such as a mouse or a track ball supplies a prescribed signal to the CPU 121 in accordance with a manipulation that is performed by a user on a display on the CRT display 127. The HDD 130 and the drive 131 store a program that is read and stored in the RAM 122 when it is executed by the CPU 121, parameters and data that are necessary when such a program is executed, data that is input or output via the communication section 124, and other information.

The drive 131 drives a magnetic disk 141, an optical disc 142, a magneto-optical disc 143, or a semiconductor memory 144.

Figure 2:
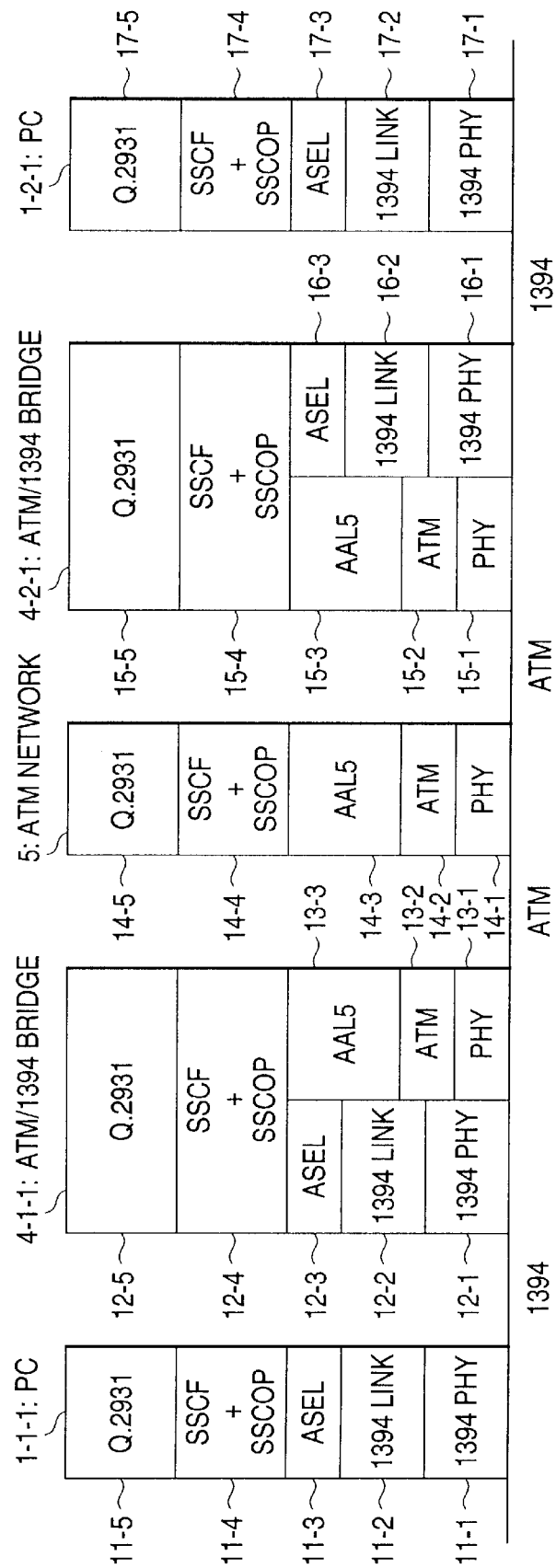
FIG. 2 shows control-plane protocol stacks in the network system of FIG. 1.
Figure 3:
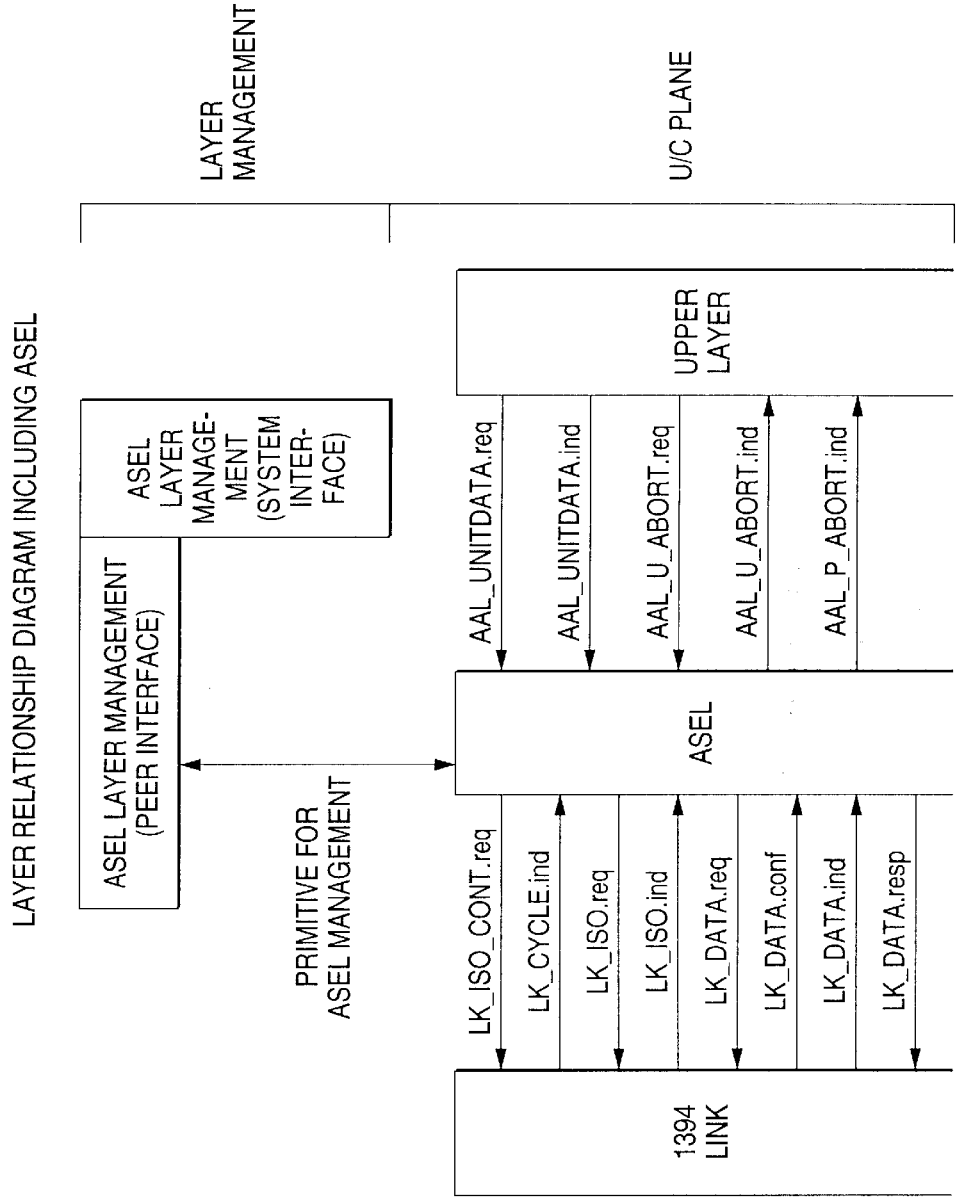
FIG. 3 shows the position of an ASEL layer.
Figure 14:
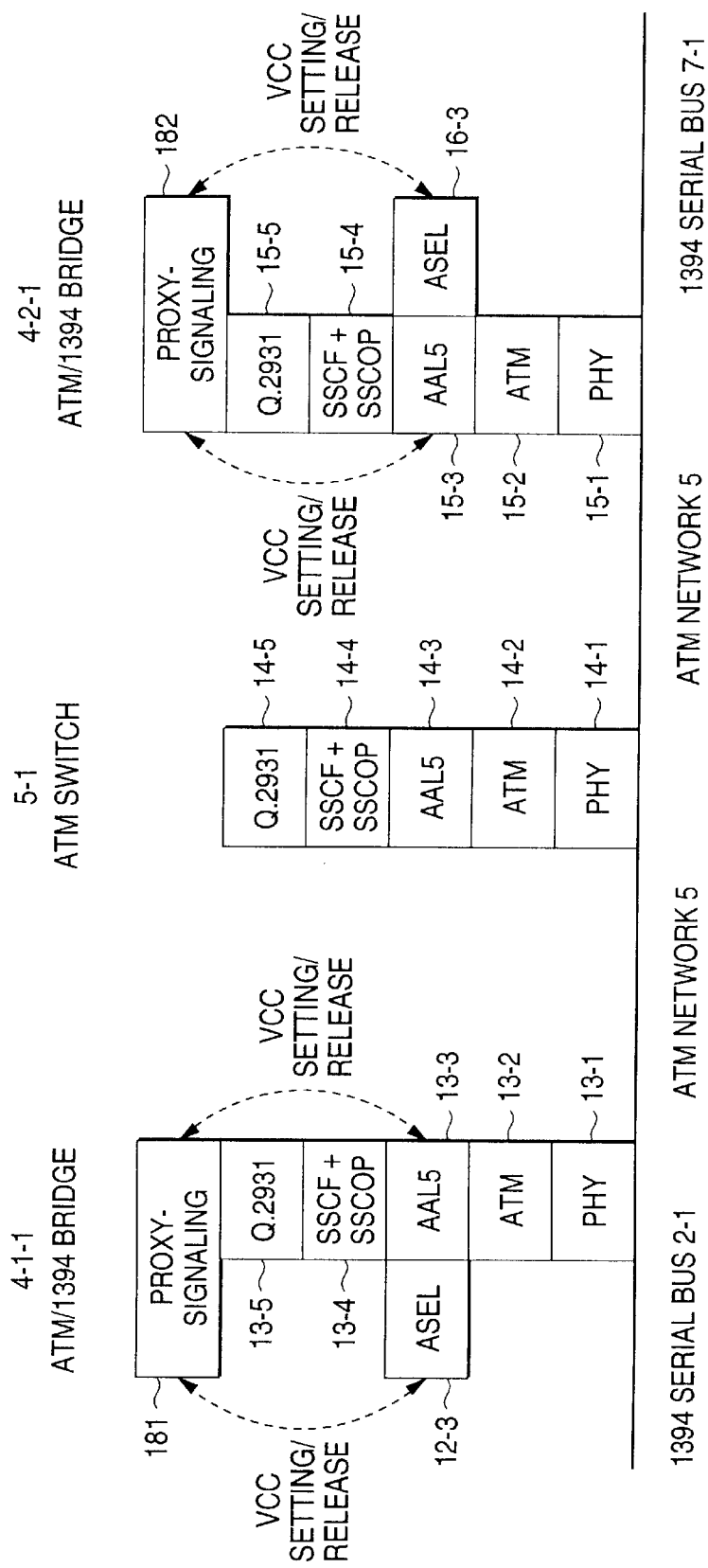
FIG. 14 shows C-plane protocol stacks in the network system of FIG. 11.

C-plane protocol stacks of ATM signaling in setting or canceling a connection between digital AV devices will now be described with reference to FIG. 14. The components in FIG. 14 having the corresponding components in FIG. 2 are given the same reference symbols as the latter. However, FIG. 14 includes a Q.2931 layer 13-5 and an SSCF+SSCOP layer 13-4 instead of the Q-2931 layer,12-5 and the SSCF+SSCOP layer 12-4 in FIG. 2, respectively, for the following reason. As is apparent from comparison between FIGS. 2 and 14, since the personal computers 1-1-1 and 1-2-1 shown in FIG. 2 are not necessary in FIG. 14, the ATM/1394 bridge 4-1-1 requires, as protocols on the IEEE 1394 serial bus 2-1 side, only the ASEL layer 12-3 and requires none of the 1394 PHY layer 12-1, the 1394 link layer 12-2, the SSCF+SSCOP layer 12-4, and the Q.2931 layer 12-5. Similarly, in the ATM/1394 bridge 4-2-1, the 1394 PHY layer 16-1, the 1394 link layer 16-2, the SSCF+SSCOP layer 16-4, and the Q.2931 layer 16-5 shown in FIG. 2 are omitted.

Instead, proxy-signaling layers 181 and 182 are provided in the respective ATM/1394 bridges 4-1-1 and 4-2-1 as uppermost application software modules. The proxy-signaling layers 181 and 182 issue a VCC setting or releasing request to the respective ASEL layers 12-3 and 16-3 and the respective AAL5 layers 13-3 and 15-3.

For example, a signaling protocol generated by the proxy-signaling layer 181 of the ATM/1394 bridge 4-1-1 is transferred in turn from a higher layer to a lower layer and thereby transferred to the ATM switch 5-1 over the ATM network 5. In the ATM switch 5-1, the signaling protocol is transferred in turn from a lower layer to a higher layer and then returned in turn from a higher layer to a lower layer. Then, the signaling protocol is transferred to the ATM/1394 bridge 4-2-1 over the ATM network 5. Also in the ATM/1394 bridge 4-2-1, the signaling protocol is transferred in turn from a lower layer to a higher layer and thereby transferred to the proxy-signaling layer 182.

A signaling protocol is terminated by the ATM/1394 bridges 4-1-1 and 4-2-1. Only a VCC setting or releasing request is issued to the ASEL layers 12-3 and 16-3 of the respective IEEE 1394 serial buses 2-1 and 7-1.

Figure 15:
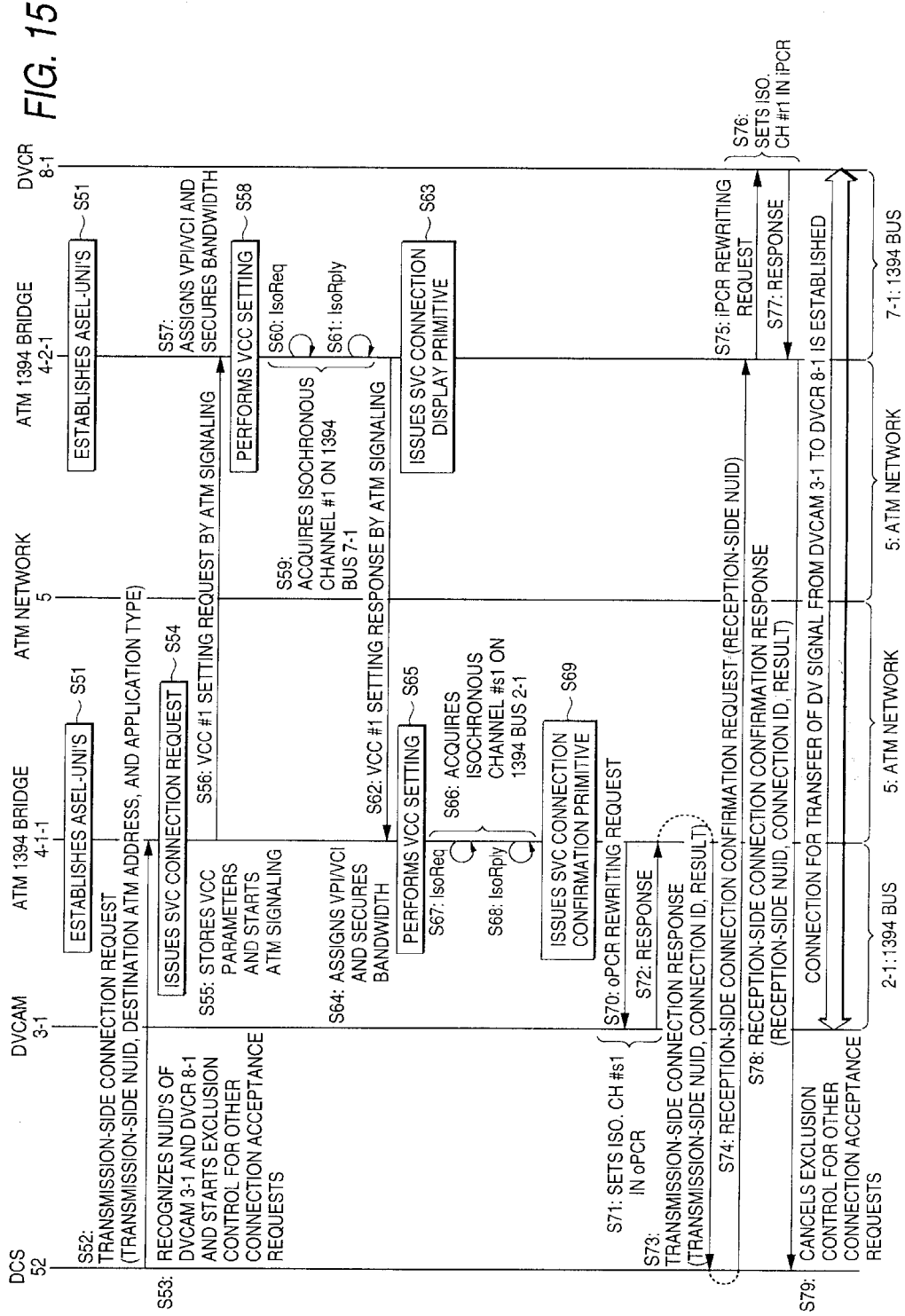
FIG. 15 is a timing chart showing a connection control process in the network system of FIG. 11.
Figure 16:
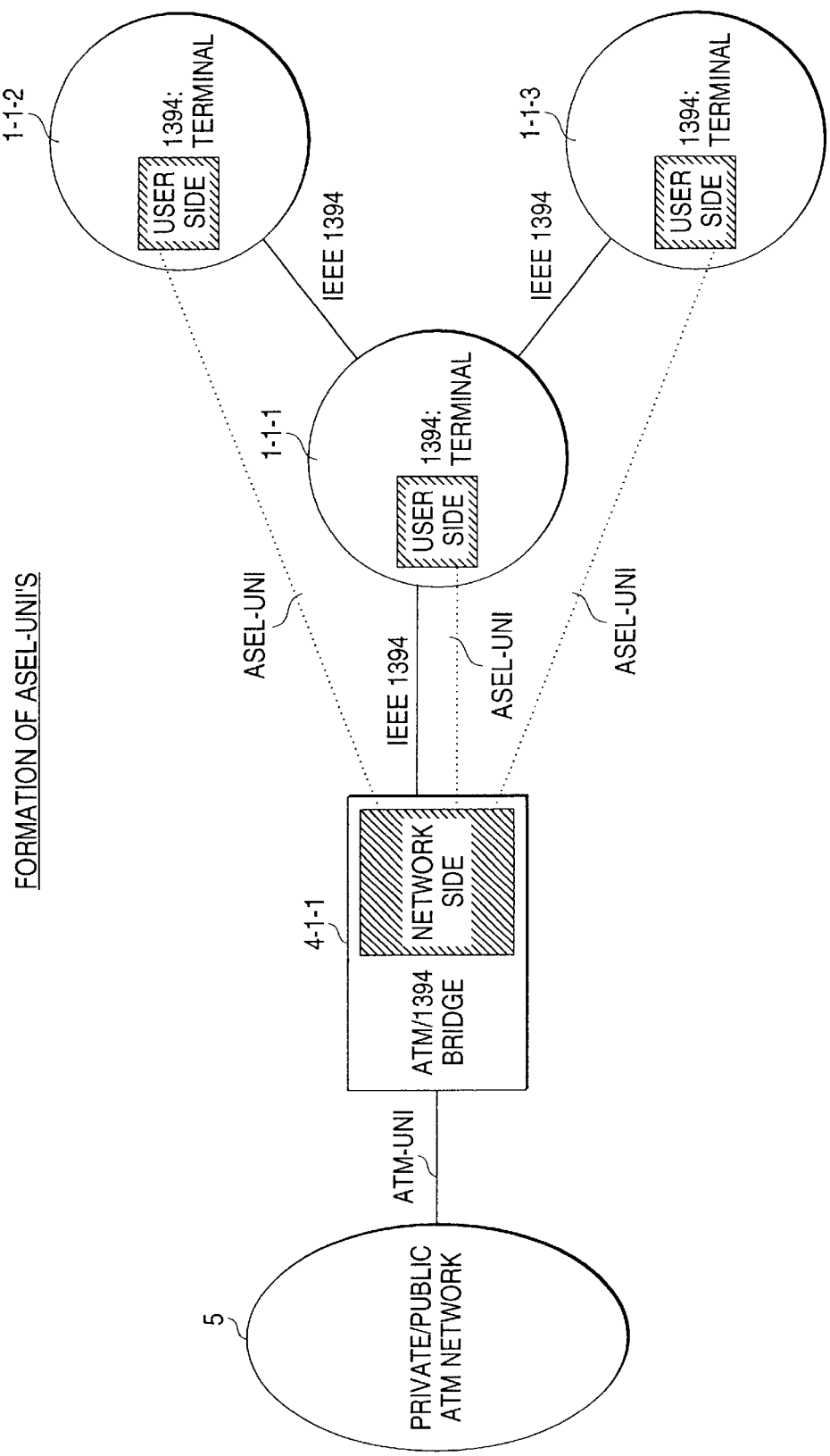
FIG. 16 shows how ASEL-UNI's are formed.

Next, a procedure for setting a connection between the digital video camera 3-1 and the digital video cassette recorder 8-1 will be described with reference to a timing chart of FIG. 15. First, at step S51, each of the ATM/1394 bridges 4-1-1 and 4-2-1 forms an ASEL entity for each ASEL-UNI. In the case of FIG. 2, ASEL-UNI's are established between the 1394 terminals incorporating the user-side ASEL entity (e.g., the personal computers 1-1-1, 1-1-2, and 1-1-3 incorporating the ASEL) in, for example, a manner shown in FIG. 16 and the network-side ATM/1394 bridge 4-1-1 and the ATM/1394 bridge 4-1-1 identifies and forms an ASEL entity for each ASEL-UNI. Every time 1394 bus resetting occurs, the ASEL-UNI's are assigned respective ASEL-UNI IDs and correlated with node unique IDs of the personal computers 1-1-1, 1-1-2, and 1-1-3 as user-side 1394 terminals and identifiers of the 1394 serial buses.

In contrast, in the invention, since no user-side 1394 terminals (personal computers) exist when ASEL-UNI entities are formed (see FIG. 14), functions for emulating user-side ASEL entities are generated in the ATM/1394 bridges 4-1-i and 4-2-j. ASEL-UNI's are established between the network-side ASEL entities of the ATM/1394 bridges and the user-side 1394 terminals which exist virtually for the respective 1394 serial buses (therefore, those 1394 terminals have virtual node unique IDs). Where a plurality of 1394 serial buses are connected to an ATM/1394 bridge, ASEL-UNI IDs are assigned to the 1394 serial buses in ascending order of their identifiers and correlated with virtual node unique IDs, identifiers of the 1394 serial buses, and ATM addresses in , for example, a manner shown in FIG. 17. Satisfactory results are obtained as long as the virtual node unique IDs have values unique to the respective 1394 serial buses of each ATM/1394 bridge; duplicated assignment of virtual node unique IDs in different ATM/1394 bridges is allowable. The lowest two figures of an ATM address correspond to a 1394 bus ID (satisfactory results are obtained as long as a corresponding relationship is determined uniquely and it is not necessary that they coincide with each other).

As described above, the IP addresses and ATM addresses of the ATM/1394 bridges 4-1-1 to 4-1-m and 4-2-1 to 4-2-n and the node unique IDs and type names of digital AV devices connected to the 1394 serial buses that are connected to the ATM/1394 bridges 4-1-1 to 4-1-m and 4-2-1 to 4-2-n have been communicated in advance from their TSCs 55-1-1 to 55-1-m and 55-2-1 to 55-2-n to the database 53 of the DCS 52 and registered therein. When instructed by a user, via the GUI 51, to transfer data from the digital video camera 3-1 to the digital video cassette recorder 8-1, to start connection setting, at step S52 the DCS 52, which manages all digital AV devices connected to the ATM-IEEE 1394 network, transmits a transmission-side connection request command that is a command for requesting establishment of a connection between the digital video camera 3-1 (digital AV data transmission-side device) and the digital video cassette recorder 8-1 (reception-side device) to the TSC 55-1-1 that is incorporated in the ATM/1394 bridge 4-1-1 by using the TCP/IP. The transmission-side connection request command prescribes, as parameters, a transmission-side node unique ID, a destination ATM address, an application type, etc. The destination ATM address is the one that has been communicated in advance by the TSC 55-2-1 that is incorporated in the reception-side ATM/1394 bridge 4-2-1 and registered in the database 53.

At step S53, the DCS 52 recognizes the node unique IDs of the digital video camera 3-1 and the digital video cassette recorder 8-1 that are included in the parameters of the transmission-side connection request command and starts an exclusion control for other connection acceptance requests to those node unique IDs.

Upon reception of the transmission-side connection request command from the DCS 52, at step S54 the TSC 55-1-1 recognizes the transmission-side node unique ID and the application type and issues an SVC (switched virtual circuit) connection request primitive to the proxy-signaling layer 181. This primitive includes, as parameters, the identifier of the transmission source 1394 serial bus, the destination ATM address, the application type (in this case, CIP format digital video), a transmission CIP packet size (in this case, 122 quadrets), a reception CIP packet size (in this case, 0), topology on the ATM network, and a pointer that points a connection identifier. An actual connection identifier is stored in the designated destination of the pointer that points a connection identifier only when the contents of the primitive have no error.

Upon reception of the SVC connection request primitive, at step S55 the proxy-signaling layer 181 confirms that the contents of the primitive have no error and then assigns a new connection identifier, stores it in the pointer destination that is designated by the TSC 55-1-1, and stores VCC parameters such as the connection identifier, a QoS type parameter (in this case, CBR), an AAL type parameter (in this case AAL5), an isochronous packet encapsulation method parameter (in this case, CIP format), a transmission/reception bandwidth parameter, and a routing area parameter (in this case, proxy signaling), etc. At this time, the proxy-signaling layer 181 does not perform VCC setting for its own ASEL entity because the ATM network 5 has not assigned VPIs/VCIs yet.

At step S56, the proxy-signaling layer 181 of the ATM/1394 bridge 4-1-1 transmits a VCC setting request message by ATM signaling to the ATM/1394 bridge 4-2-1. At this time, the ATM/1394 bridge 4-1-1 specifies, in the VCC setting request, by using, for example, an information element "broadband high layer information" of a setup message, that digital video data using the CIP is to flow through the connection.

Figures 17, 18:
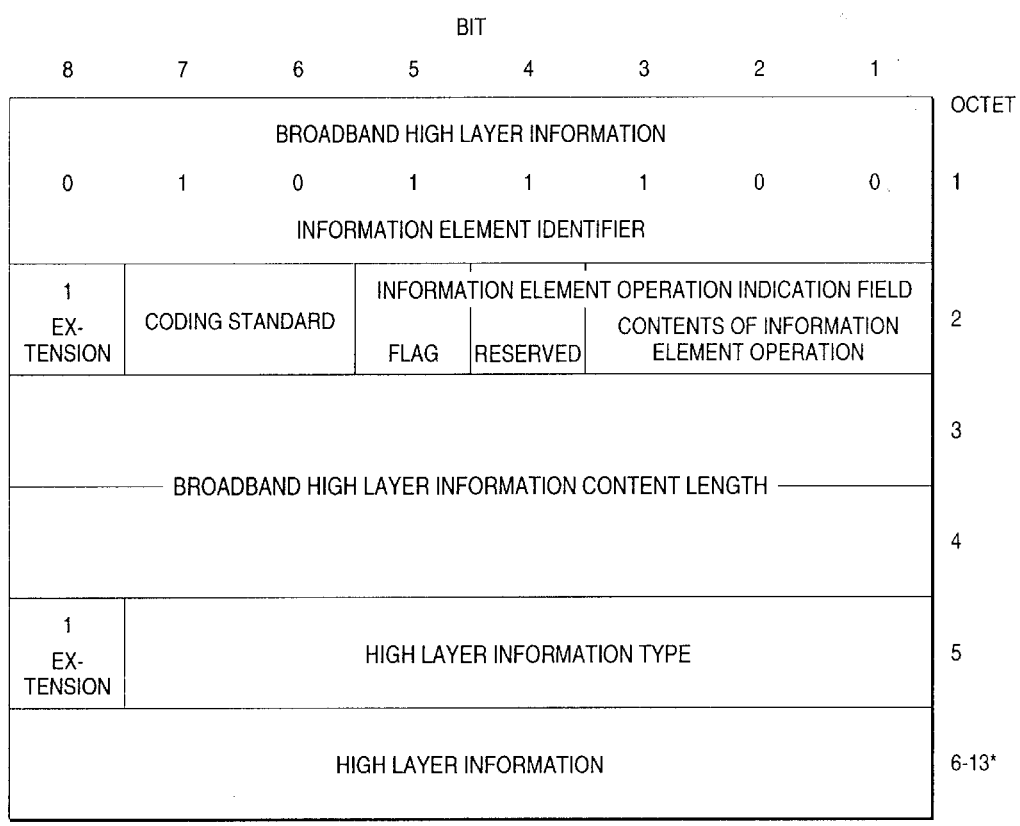
FIG. 17 shows an example of a table including virtual node unique IDs.
FIG. 18 shows an information element "broadband high layer information"

The information element "broadband high layer information," which is to provide an address-designated entity with a function of checking possibility of communication, is configured as shown in FIG. 18. An information element identifier is provided in the head octet. An extension flag is provided at the MSB of the next octet, coding standard data is provided in the next 2 bits, and the remaining 5 bits are made an information element operation indication field.

The MSB-side 1 bit of the 5-bit information element operation indication field is given a value "1" when explicit operation indication is to be made (i.e., a general error processing procedure is not applied) and is given a value "0" when the information element operation indication field is meaningless (the general error processing procedure is applied).

In the next 1 bit, which is reserved for path-along request, usually coding is made into "0" (a case of no path-along request).

The last 3 bits are given a value "000" in the case of call opening, "001" in the case of information element discard and processing continuation, "010" in the case of information element discard, processing continuation, and status reporting, "1101" in the case of message discard and disregard, and "110" in the case of message discard and status reporting. The other values are reserved for other cases.

The third and fourth octets indicate a broadband high layer information content length. The MSB of the fifth octet is an extension flag and the remaining 7 bits indicate a high layer information type. High layer information is provided in the sixth to 13th (maximum case) octets.

For example, the high layer information type of the fifth octet is information shown in FIG. 19. A code all the 7 bits of which are "0" is reserved for use in an ISO/IEC standard. A code in which the higher 6 bits of the 7 bits are "0" and the LSB is "1" is a user-specific code. If this code is used, a coding method of the sixth to 13th octets can be defined by a user. It is necessary that end users agree with each other as to a manner of use of codes.

A code in which the higher 5 bits of the 7 bits are "0" and the lower 2 bits are "1" is a vendor-specific application identifier. A code in which the third bit from the LSB among the 7 bits is "1" and the other bits are "0" is prescribed in the ITU-T/TTC B-ISDN Tele-service Recommendation/Standard. The other 7-bit codes are reserved.

Upon reception of the VCC setting request, at step S57 the ATM/1394 bridge 4-2-1 recognizes, based on the ATM address of the information element "called party number," that the signaling is proxy-signaling (recognizes that the SEL of the ATM address corresponds to the identifier of the IEEE 1394 serial bus). Further, the ATM/1394 bridge. 4-2-1 can identify the transmission source 1394 serial bus (the SEL value shown in FIG. 8 corresponds to the 1394 serial bus). At step S58, the ATM/1394 bridge 4-2-1 searches for an ASEL-UNI ID based on the identifier of the 1394 serial bus (see FIG. 17) and sets, for the ASEL entity that is identified by the thus-found ASEL-UNI ID, VCC parameters such as a connection identifier VPI/VCI, a Qos type parameter (in this case, CBR), an AAL type parameter (in this case, AAL5), an isochronous packet encapsulation method parameter (in this case, CIP format), a transmission/reception bandwidth parameter, and a routing area parameter (in this case, proxy signaling) in a manner shown in FIG. 20.

Figure 4:
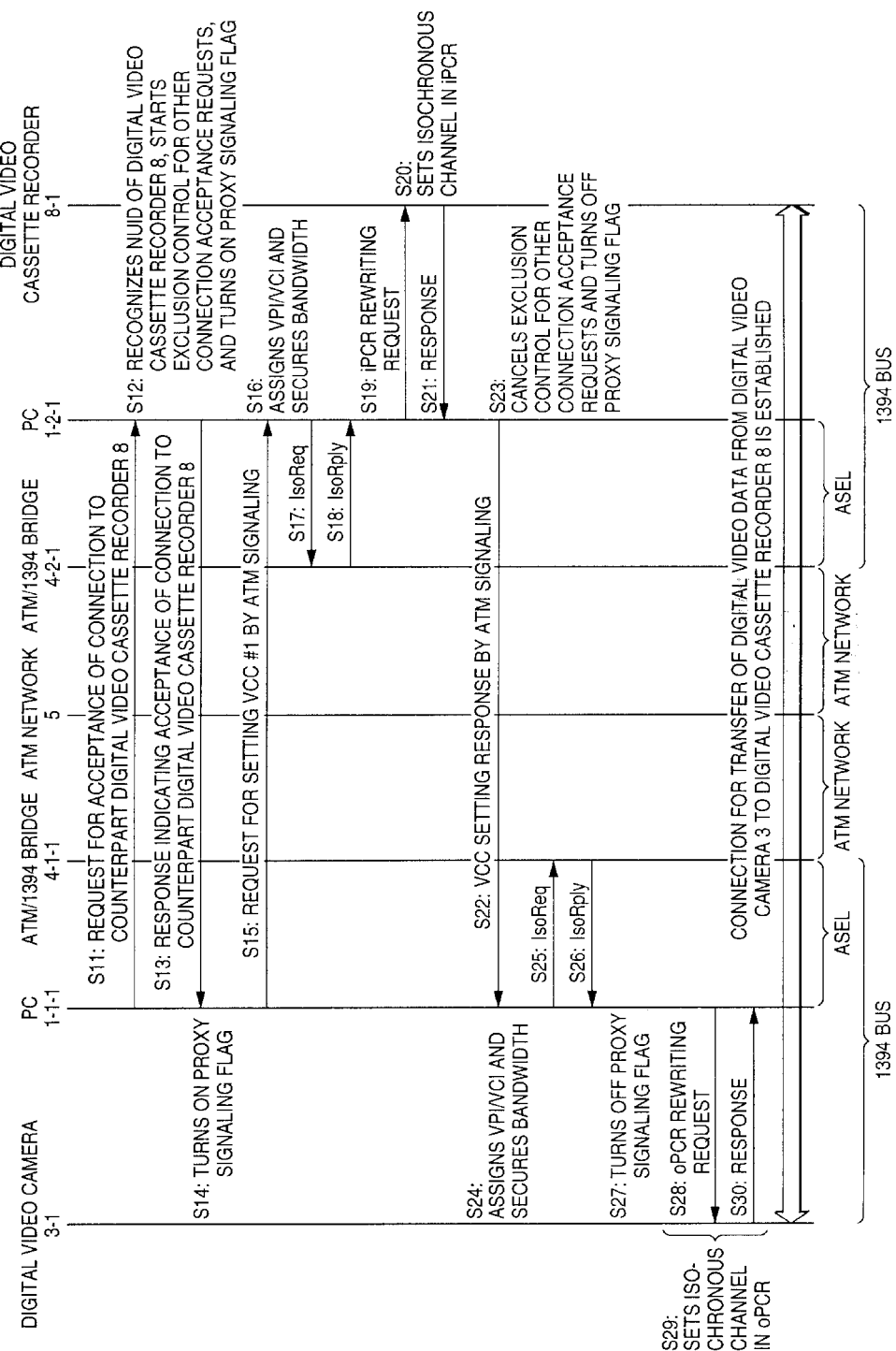
FIG. 4 is a timing chart showing an operation of the network system of FIG. 1.

At step S59, the ATM/1394 bridge 4-2-1 assigns an isochronous channel to the VPI/VCI assigned to the VCC. In the conventional case, as shown in FIG. 4, an IsoReq message of an ASEL-CMP is transmitted to the network side from the apparatus on the user side of the ASEL-UNI in FIG. 16 (see steps S17 and S18 in FIG. 4). In the connection control procedure according to the invention, since the ASEL-UNI exists virtually in the same apparatus, actually there is no user-side apparatus to transmit an IsoReq message. Therefore, since the routing area parameter (ASEL-VCC parameter) has already been set to proxy signaling, the ASEL 16-3 calls a function for emulating reception of an IsoReq message. As a result, at step S60, the ASEL 16-3 operates as if it received an IsoReq message though it does not receive an IsoReq message actually. With this function calling as a start, the ASEL 16-3 assigns an isochronous channel and registers a result as a VCC parameter. At this time, actually processing of transmitting an IsoRply message is not performed at step S61.

At step S62, the ATM/1394 bridge 4-2-1 transmits a VCC setting response message by ATM signaling to the ATM/1394 bridge 4-1-1. At step S63, the proxy-signaling layer 182 of the ATM/1394 bridge 4-2-1 issues an SVC connection display primitive to the TSC 55-2-1. This primitive includes, as parameters, the identifier of the reception-side 1394 serial bus, the connection identifier, the transmission source ATM address, the VPI, the VCI, the isochronous channel number, the application type (in this case, CIP format digital video), the transmission CIP packet size (in this case, 0), the reception CIP packet size (in this case, 122 quadrets), and the topology on the ATM network.

Upon reception of the VCC setting response message, at step S64 the ATM/1394 bridge 4-1-1 stores, in its own ASEL entity, as a VCC parameter, the VPI/VCI assigned in the VCC setting response message. At step S65, the ATM/1394 bridge 4-1-1 searches for an ASEL-UNI ID based on the identifier of the 1394 serial bus that was stored before like the ATM/1394 bridge 4-2-1 did and sets, for the ASEL entity that is identified by the thus-found ASEL-UNI ID, VCC parameters that are a combination of the parameters that were stored at step S55 and the VPI/VCI assigned above.

At step S66, to assign an isochronous channel to the VPI/VCI assigned to the VCC, the ASEL 12-3 calls a function for emulating reception of an IsoReq message as was done in the ATM/1394 bridge 4-2-1 because the routing area parameter (ASEL-VCC parameter) is set to proxy signaling. As a result, at step S67 an operation is performed as if an IsoReq message were received though it is not received actually. With this function calling as a start, the ASEL 12-3 assigns an isochronous channel and registers the resulting isochronous channel (in this case, #s1, for example) as a VCC parameter. At this time, processing of transmitting an IsoRply message is not performed actually at step S68.

At step S69, the proxy signaling layer 181 of the ATM/1394 bridge 4-1-1 issues an SVC connection confirmation primitive to the TSC 55-1-1. This primitive includes, as parameters, the identifier of the transmission-side 1394 serial bus, the connection identifier, the VPI, the VCI, the isochronous channel number. Upon reception of this primitive, the TSC 55-1-1 checks the identifier of the transmission-side 1394 serial bus and the connection identifier and recognizes that the digital AV device to be controlled is the digital video camera 3-1.

At step S70, to enable the digital video camera 3-1 to transmit data on the isochronous channel #s1 that has been communicated by the primitive, the TSC 55-1-1 requests the digital video camera 3-1 to rewrite the contents of an oPCR (output plug control register). At step S71, the digital video camera 3-1 sets the isochronous channel #s1 in the oPCR. At step S72, the digital video camera 3-1 transmits, to the TSC 55-1-1 of the ATM/1394 bridge 4-1-1, a response to the effect that the isochronous channel #s1 has been set in the oPCR.

Upon reception of this response, at step S73 the TSC 55-1-1 issues a transmission-side connection response command to the DCS 52. The parameters of the transmission-side connection response command are the transmission-side node unique ID, the connection identifier, and a result.

Upon reception of the transmission-side connection response command, at step S74 the DCS 52 confirms that the result is normal and then confirms that the transmission-side node unique ID is the node-unique ID of the digital video camera 3-1 and stores it in such a manner that it is correlated with the connection identifier. Further, the DCS 52 searches for a node unique ID of the reception-side digital AV device based on the transmission-side node unique ID and issues, according to the TCP/IP, a reception-side connection confirmation request command to the TSC 55-2-1 that controls the reception-side digital AV device. The parameter of the reception-side connection confirmation request command is the reception-side node unique ID.

Upon reception of the thus-issued reception-side connection confirmation request command, at step S74 the TSC 55-2-1 searches for an identifier of the 1394 serial bus that is connected with the digital AV device (in this case, the digital video cassette recorder 8-1) corresponding to the reception-side node unique ID (parameter) and checks whether an SVC connection display primitive including the identifier of the 1394 serial bus has already been received from its own proxy-signaling layer 182. If it has already been received, to enable the digital video cassette recorder 8-1 to receive data on the already assigned isochronous channel #r1, at step S75 the TSC 55-2-1 requests the digital video cassette recorder 8-1 to rewrite the contents of an iPCR (input plug control register). At step S76, the digital video cassette recorder 8-1 sets the isochronous channel #r1 in the iPCR. At step S77, the digital video cassette recorder 8-1 transmits, to the TSC 55-2-1 of the ATM/1394 bridge 4-2-1, a response to the effect that the isochronous channel #r1 has been set in the iPCR.

Upon reception of the response that was transmitted at step S77, at step S78 the TSC 55-2-1 issues a reception-side connection confirmation response command to the DCS 52. The parameters of this command are the reception-side node unique ID, the connection identifier, and a result.

Upon reception of the reception-side connection confirmation response command that was transmitted at step S78, the DCS 52 recognizes, based on the reception-side node unique ID and the connection identifier, that the transmission-side digital AV device is the digital video camera 3-1 and also recognizes that connection setting for transfer of a digital video signal from the digital video camera 3-1 to the digital video cassette recorder 8-1 has succeeded. At step S79, the DCS 52 cancels the exclusion control for connection acceptance requests to the digital video camera 3-1 and the digital video cassette recorder 8-1 from the other digital AV devices.

In the above manner, a connection for transfer of digital video data from the digital video camera 3-1 to the digital video cassette recorder 8-1 is established.

The series of operations described above can be performed by either hardware or software. Where the series of operations is performed by software, a program constituting the software is installed from a program storage medium in a computer that is incorporated in dedicated hardware or, for example, a general-purpose personal computer that can perform various functions when various programs are installed therein.

As shown in FIG. 12, the program storage medium for storing a program that is installed in a computer and rendered in such a state as to be executable by the computer is the magnetic disk 91 (including the floppy disk), the optical disc 92 (including the CD-ROM (compact disc-read only memory) and the DVD (digital versatile disc)), the magneto-optical disc 93 (including the MD (mini-disc), the package medium such as the semiconductor memory 94, the ROM 113 in which a program is stored temporarily or permanently, or a like storage medium.

In another case, as shown in FIG. 13, the program storage medium is the magnetic disk 141 (including the floppy disk), the optical disc 142 (including the CD-ROM and the DVD), the magneto-optical disc 143 (including the MD), the package medium such as the semiconductor memory 144, the ROM 123 in which a program is stored temporarily or permanently, the hard disks of the hard disk drive 130, or a like storage medium.

When necessary, a program is stored in the program storage medium via an interface such as a router or a modem by using a wired or wireless communication medium such as a local area network, the Internet, or digital satellite broadcast.

In this specification, steps of a program to be stored in the program storage medium naturally include ones that are executed in time series in order of description and also include ones that are not necessarily executed in time series and may be executed parallel or individually.

In this specification, the term "system" means the entire apparatus that is composed of a plurality of apparatuses and devices.

In the communication control apparatus, the communication control method, and the program storage medium according to the first aspect of the invention, address information of the second network that is assigned to the first network and communicated by the bridges are stored and a connection between devices via the first network and the second network is controlled by using the address information. This makes it unnecessary to make selection on the first network by using the node unique ID of a reception-side device prior to ATM signaling, and thereby enables quick and reliable connection processing.

In the communication control apparatus, the communication control method, and the program storage medium according to the second aspect of the invention, address information of the second network that is assigned to the first network is communicated to a second communication control apparatus. This makes it possible to perform, quickly and reliably, connection between devices connected to the first network while cooperation is made with the second communication control apparatus.

In the communication control system, the communication control method, and the program storage medium according to the third aspect of the invention, the first apparatuses assign address information of the second network to the first network and notify the second apparatus of the address information the second apparatus controls a connection between devices connected to the first network by using the address information. This makes it possible to decrease the number of personal computers that are weak, to thereby increase the reliability and the resistance to troubles of the entire system.

Further, since a connection control can be performed by using the three-tier resource management model, it is becomes easier to expand large-scale network systems.

What is claimed is:

1. A communication control apparatus which controls a communication of a network to which a plurality of bridges that interface between a first network and a second network are connected, comprising:

storage control means for controlling storage of address information of the second network that is assigned to the first network and that is communicated from the bridges; and connection control means for controlling a connection, via the first network and the second network, between devices connected to the first network by using the address information of the first network that was stored based on the control of the storage control means.

2. The communication control apparatus according to claim 1, wherein the first network is IEEE 1394 serial buses and the second network is an ATM network.

3. The communication control apparatus according to claim 1, wherein the connection control means performs connection on the network in place of the devices.

4. The communication control apparatus according to claim 1, further comprising exclusion processing means for preventing, when two of the devices are to be connected to each other via the network, the two devices from being connected to other devices.

5. A communication control method of a communication control apparatus which controls a communication of a network to which a plurality of bridges that interface between a first network and a second network are connected, comprising:

a storage control step of controlling storage of address information of the second network that is assigned to the first network and that is communicated from the bridges; and a connection control step of controlling a connection, via the first network and the second network, between devices connected to the first network by using the address information of the first network that was stored based on the control of the storage control step.

6. A program storage medium for causing a communication control apparatus which controls a communication of a network to which a plurality of bridges that interface between a first network and a second network are connected, to execute a process comprising:

a storage control step of controlling storage of address information of the second network that is assigned to the first network and that is communicated from the bridges; and a connection control step of controlling a connection, via the first network and the second network, between devices connected to the first network by using the address information of the first network that was stored based on the control of the storage control step.

7. A communication control apparatus which interfaces between a first network and a second network and controls a communication of a device connected to the first network in cooperation with a second communication control apparatus, comprising:

assigning means for assigning address information of the second network to a part of the first network connected to the communication control apparatus; and notifying means for notifying the second communication control apparatus of the address information of the second network that was assigned to the part of the first network by the assigning means.

8. The communication control apparatus according to claim 7, further comprising:

concealing means for interfacing between the first network and the second network and for concealing the part of the first network from a higher layer; and correlating means for correlating the concealing means with at least one of the part of the first network and a virtual device connected to the part of the first network.

9. The communication control apparatus according to claim 8, further comprising emulating means for emulating an operation of the concealing means.

10. The communication control apparatus according to claim 7, wherein the first network is IEEE 1394 serial buses and the second network is an ATM network.

11. A communication control method of a communication control apparatus which interfaces between a first network and a second network and controls a communication of a device connected to the first network in cooperation with a second communication control apparatus, comprising:

an assigning step of assigning address information of the second network to a part of the first network connected to the communication control apparatus; and a notifying step of notifying the second communication control apparatus of the address information of the second network that was assigned to the part of the first network by the assigning step.

12. A program storage medium for causing a communication control apparatus which interfaces between a first network and a second network and controls a communication of a device connected to the first network in cooperation with a second communication control apparatus, to execute a process comprising:

an assigning step of assigning address information of the second network to a part of the first network connected to the communication control apparatus; and a notifying step of notifying the second communication control apparatus of the address information of the second network that was assigned to the part of the first network by the assigning step.

13. A communication control system comprising:

a plurality of first apparatuses for interfacing between a first network and a second network, each of the first apparatuses comprising:

assigning means for assigning address information of the second network to a part of the first network that is connected to the first apparatus; and notifying means for notifying a second apparatus of the address information of the second network that was assigned to the part of the first network by the assigning means; and the second apparatus for controlling a communication in a network between devices connected to the first apparatuses via the first network, the second apparatus comprising:

storage control means for controlling storage of the address information of the second network that is assigned to the first network and that is communicated from the first apparatuses; and connection control means for controlling a connection, via the first network and the second network, between devices connected to the first network by using the address information of the first network that was stored based on the control of the storage control means.

14. A communication control method of a communication control system comprising a plurality of first apparatuses for interfacing between a first network and a second network and a second apparatus for controlling a communication in a network between devices connected to the first apparatuses via the first network, the communication control method comprising:

a communication control method of each of the first apparatuses, comprising:

an assigning step of assigning address information of the second network to a part of the first network that is connected to the first apparatus; and a notifying step of notifying the second apparatus of the address information of the second network that was assigned to the part of the first network by the assigning step; and a communication control method of the second apparatus, comprising:
- a storage control step of controlling storage of the address information of the second network that is assigned to the first network and that is communicated from the first apparatuses; and
- a connection control step of controlling a connection, via the first network and the second network, between devices connected to the first network by using the address information of the first network that was stored based on the control of the storage control step.

15. A program storage medium for causing each first apparatus and a second apparatus of a communication control system comprising a plurality of first apparatuses for interfacing between a first network and a second network and the second apparatus for controlling a communication in a network between devices connected to the first apparatuses via the first network, to execute a first process and a second process, respectively, the first process comprising:
- an assigning step of assigning address information of the second network to a part of the first network that is connected to the first apparatus; and
- a notifying step of notifying the second apparatus of the address information of the second network that was assigned to the part of the first network by the assigning step, the second process comprising:
  - a storage control step of controlling storage of the address information of the second network that is assigned to the first network and that is communicated from the first apparatuses; and
  - a connection control step of controlling a connection, via the first network and the second network, between devices connected to the first network by using the address information of the first network that was stored based on the control of the storage control step.

* * * * *

UNITED STATES PATENT AND TRADEMARK OFFICE
CERTIFICATE OF CORRECTION

PATENT NO.    : 6,601,127 B1
DATED         : July 29, 2003
INVENTOR(S)   : Takashi Nomura et al.

It is certified that error appears in the above-identified patent and that said Letters Patent is hereby corrected as shown below:

<u>Column 5,</u>
Line 1, change "81" to -- 8-1 --.

<u>Column 12,</u>
Line 53, change "layer," to -- layer --.

<u>Column 15,</u>
Line 15, change "1101" to -- 101 --.

Signed and Sealed this

Ninth Day of March, 2004

JON W. DUDAS
*Acting Director of the United States Patent and Trademark Office*